United States Patent
Lin et al.

(10) Patent No.: US 11,761,918 B2
(45) Date of Patent: Sep. 19, 2023

(54) SOLID-LIQUID CONTACT ELECTRIFICATION-BASED SELF-DRIVING CHEMICAL SENSOR, SENSING METHOD, AND METHOD OF MANUFACTURING THE SAME

(71) Applicant: National Tsing Hua University, Hsinchu (TW)

(72) Inventors: Zong-Hong Lin, Hsinchu (TW); Yu-Ping Pao, Hsinchu (TW); Subhodeep Chatterjee, Hsinchu (TW); Arnab Pal, Hsinchu (TW); Yu-Zih Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 134 days.

(21) Appl. No.: 17/355,186

(22) Filed: Jun. 23, 2021

(65) Prior Publication Data
US 2022/0349851 A1    Nov. 3, 2022

(30) Foreign Application Priority Data
Apr. 19, 2021    (TW) .................................. 110113969

(51) Int. Cl.
*G01N 27/07* (2006.01)
*H02N 1/04* (2006.01)
(Continued)

(52) U.S. Cl.
CPC ............... *G01N 27/07* (2013.01); *H02N 1/04* (2013.01); *B82Y 30/00* (2013.01); *B82Y 35/00* (2013.01)

(58) Field of Classification Search
CPC .......... G01N 27/07; G01N 27/60; H02N 1/04; B82Y 30/00; B82Y 35/00; B82Y 15/00; B82Y 40/00
See application file for complete search history.

(56) References Cited

U.S. PATENT DOCUMENTS

| | | | |
|---|---|---|---|
| 2003/0076698 A1* | 4/2003 | Sully, III | H02M 7/06 363/125 |
| 2005/0130240 A1* | 6/2005 | Lin | G01N 33/587 424/490 |
| 2012/0184040 A1* | 7/2012 | Zhang | G01N 33/1813 422/69 |

FOREIGN PATENT DOCUMENTS

| | | | | |
|---|---|---|---|---|
| CN | 104467514 | | 3/2015 | |
| CN | 110208614 A | * | 9/2019 | ............. G01R 29/24 |
| WO | WO-2015035788 A1 | * | 3/2015 | ............... H02N 1/04 |

OTHER PUBLICATIONS

Espacenet Translation Description WO2015035788A1—https://worldwide.espacenet.com/, Accessed Dec. 2022 (Year: 2022).*

(Continued)

*Primary Examiner* — Daniel R Miller
(74) *Attorney, Agent, or Firm* — JCIPRNET

(57) ABSTRACT

A solid-liquid contact electrification-based self-driving chemical sensor includes a container, a contact liquid, an electrode, a solid triboelectric layer, a rectifier, a load, and a displacement device. The contact liquid is placed in the container. The electrode may be actively or passively moved into the container to be immersed in or emerged from the contact liquid. The solid triboelectric layer surrounds and covers a surface of the electrode. The solid triboelectric layer includes a sensing layer which becomes a reacted sensing layer by reacting to a target analyte. The rectifier and the load are connected to the electrode. The displacement device is connected to the electrode or the container to perform a periodic reciprocating motion, so that the solid triboelectric layer is in contact with and separated from the contact liquid, thereby generating a surface charge transfer to generate an electrical output signal.

24 Claims, 16 Drawing Sheets

(51) Int. Cl.
   *B82Y 30/00* (2011.01)
   *B82Y 35/00* (2011.01)

(56) References Cited

OTHER PUBLICATIONS

Shi Q, Sun Z, Zhang Z, Lee C. Triboelectric Nanogenerators and Hybridized Systems for Enabling Next-Generation IoT Applications. Research (Wash D C). Feb. 26, 2021;2021:6849171. doi: 10.34133/2021/6849171. PMID: 33728410; PMCID: PMC7937188 (Year: 2021).*

Subhodeep Chatterjee et al., "Enhanced sensing performance of triboelectric nanosensors by solid-liquid contact electrification", Nano Energy vol. 77, Nov. 2020, pp. 1-8.

Xiaolong Zhang et al., "Liquid-solid contact triboelectrification and its use in self-powered nanosensor for detecting organics in water", Nano Energy vol. 30, Dec. 2016, pp. 321-329.

Zong-Hong Lin et al., "Enhanced Triboelectric Nanogenerators and Triboelectric Nanosensor Using Chemically Modified TiO2 Nanomaterials", ACS Nano 7(5), May 28, 2013, pp. 4554-4560.

"Office Action of Taiwan Counterpart Application", dated Apr. 11, 2022, p. 1-p. 8.

Xiaolong Zhang et al., "Liquid-solid contact triboelectrification and its use in self-powered nanosensor for detecting organics in water", Nano Energy, Oct. 12, 2016, pp. 1-22.

Jeong-Won Lee et al., "Theoretical study of micro/nano roughness effect on water-solid triboelectrification with experimental approach", Nano Energy, Aug. 4, 2018, pp. 1-24.

Subhodeep Chatterjee et al., "Enhanced sensing performance of triboelectric nanosensors by solid-liquid contact electrification", Nano Energy, Jun. 15, 2020, pp. 1-42.

* cited by examiner

SOLID-LIQUID CONTACT ELECTRIFICATION-BASED SELF-DRIVING CHEMICAL SENSOR, SENSING METHOD, AND METHOD OF MANUFACTURING THE SAME

CROSS-REFERENCE TO RELATED APPLICATION

This application claims the priority benefit of Taiwan application serial no. 110113969, filed on Apr. 19, 2021. The entirety of the above-mentioned patent application is hereby incorporated by reference herein and made a part of this specification.

BACKGROUND OF THE INVENTION

Field of the Invention

The invention relates to a chemical sensor, a sensing method, and a method of manufacturing the same, and in particular to a sensing method of a solid-liquid contact electrification-based self-driving chemical sensor and a method of manufacturing the same.

Description of Related Art

In today's chemical sensor and drug screening research, most of the used assay methods need to be labelled to visualize or quantify proteins, DNA, small molecules, etc. The most common label categories are organic fluorescent dye molecules, radioligands, etc. However, the sensing system that needs to be labeled has a variety of experimental uncertainties, and most conventional chemical sensors (such as HPLC, mass spectrometer, etc.) are larger in size, require professional operators, and do not have a self-powered system, and therefore do not readily support on-site detection.

SUMMARY OF THE INVENTION

The invention provides a solid-liquid contact electrification-based self-driving chemical sensor that is small in size, does not require a professional operator, and has a self-powered system, and therefore may support on-site detection.

A solid-liquid contact electrification-based self-driving chemical sensor of an embodiment of the invention includes a container, a contact liquid, an electrode, a solid triboelectric layer, a rectifier, a load, and a displacement device. The contact liquid is placed in the container. The electrode may be actively or passively moved into the container to be immersed in or emerged from the contact liquid. The solid triboelectric layer surrounds and covers a surface of the electrode. The solid triboelectric layer includes a sensing layer selective to a target analyte. The rectifier and the load are connected to the electrode. The displacement device is connected to the electrode or the container to perform a periodic reciprocating motion, so that the solid triboelectric layer is in contact with and separated from the contact liquid, thereby generating a surface charge transfer to generate an electrical output signal.

A solid-liquid contact electrification-based self-driving chemical sensor of an embodiment of the invention includes a container, a contact liquid, an electrode, a solid triboelectric layer, a rectifier, a load, and a displacement device. The contact liquid is placed in the container. The electrode may be actively or passively moved into the container to be immersed in or emerged from the contact liquid. The solid triboelectric layer surrounds and covers a surface of the electrode. The solid triboelectric layer includes a reacted sensing layer which is formed by reacting a sensing layer with a target analyte, and a work function or a hydrophilicity/hydrophobicity of the sensing layer is altered from a work function or a hydrophilicity/hydrophobicity of the reacted sensing layer. The rectifier and the load are connected to the electrode. The electrode or the container is moved by the displacement device to perform a periodic reciprocating motion, so that the solid triboelectric layer is in contact with and separated from the contact liquid, thereby generating a surface charge transfer to generate an electrical output signal.

A sensing method of a solid-liquid contact electrification-based self-driving chemical sensor of an embodiment of the invention includes: providing an electrode, wherein a surface of the electrode is surrounded and covered by a solid triboelectric layer; and performing a periodic reciprocating movement of contact and separation on the solid triboelectric layer and a contact liquid, thereby generating a surface charge transfer to generate an electrical output signal, wherein the solid triboelectric layer includes a reacted sensing layer, wherein the reacted sensing layer is formed by reacting the sensing layer with a target analyte, and a work function or a hydrophilicity/hydrophobicity of the sensing layer is altered after reacting with the target analyte.

A method of manufacturing a solid-liquid contact electrification-based self-driving chemical sensor of an embodiment of the invention includes: providing an electrode; forming a sensing layer to cover a surface of the electrode; reacting the sensing layer with a target analyte to form a reacted sensing layer, wherein the sensing layer and the reacted sensing layer form a solid triboelectric layer; connecting the electrode with a rectifier; and connecting the electrode or the container to a displacement device to perform a periodic reciprocating motion, so that the solid triboelectric layer is in contact with and separated from a contact liquid, thereby generating a surface charge transfer to generate an electrical output signal.

Based on the above, the solid-liquid contact electrification-based self-driving chemical sensor of an embodiment of the invention has a small size, does not require a professional operator, and has a self-powered system to support on-site detection. Furthermore, the solid-liquid contact electrification-based self-driving chemical sensor of an embodiment of the invention is a label-free detection system that may be applied to on-site environmental detection, or the detection of the content of chemical substances in various beverages, etc. In addition, the method of manufacturing the solid-liquid contact electrification-based self-driving chemical sensor of an embodiment of the invention does not require expensive equipment and machinery, and therefore manufacturing cost may be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
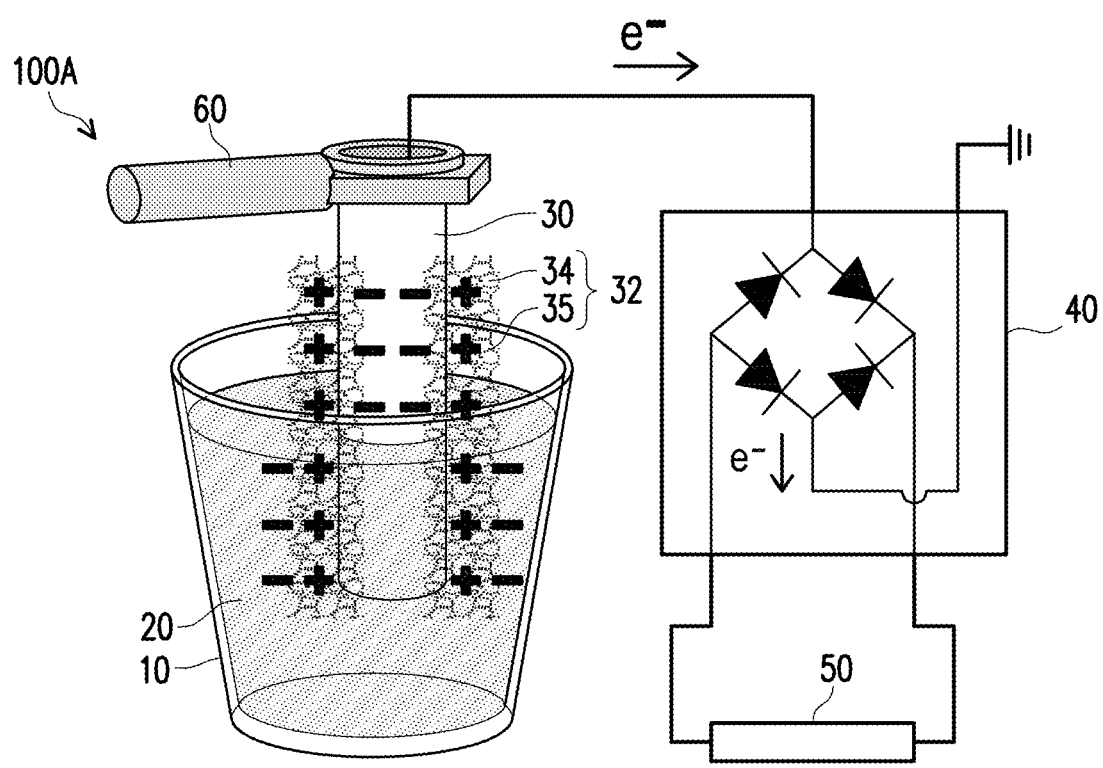
FIG. 1A to FIG. 1C are schematic diagrams of several solid-liquid contact electrification-based self-driving chemical sensors of the embodiments of the invention.
Figure 1B:
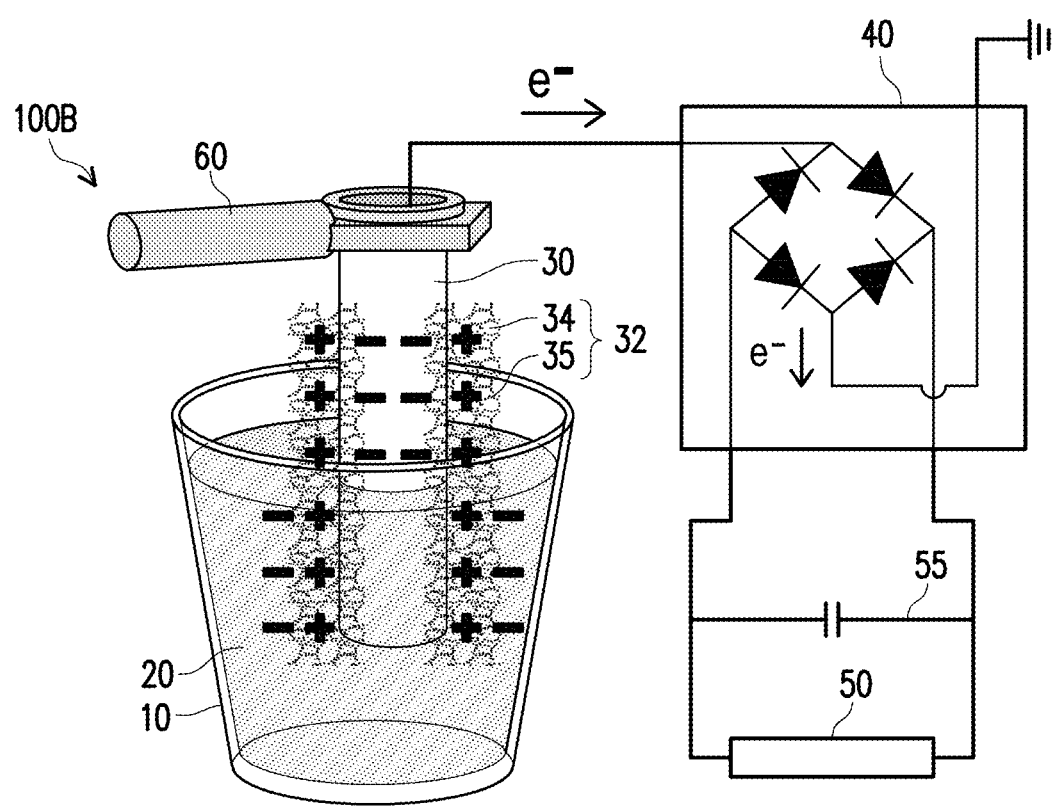
Figure 1C:
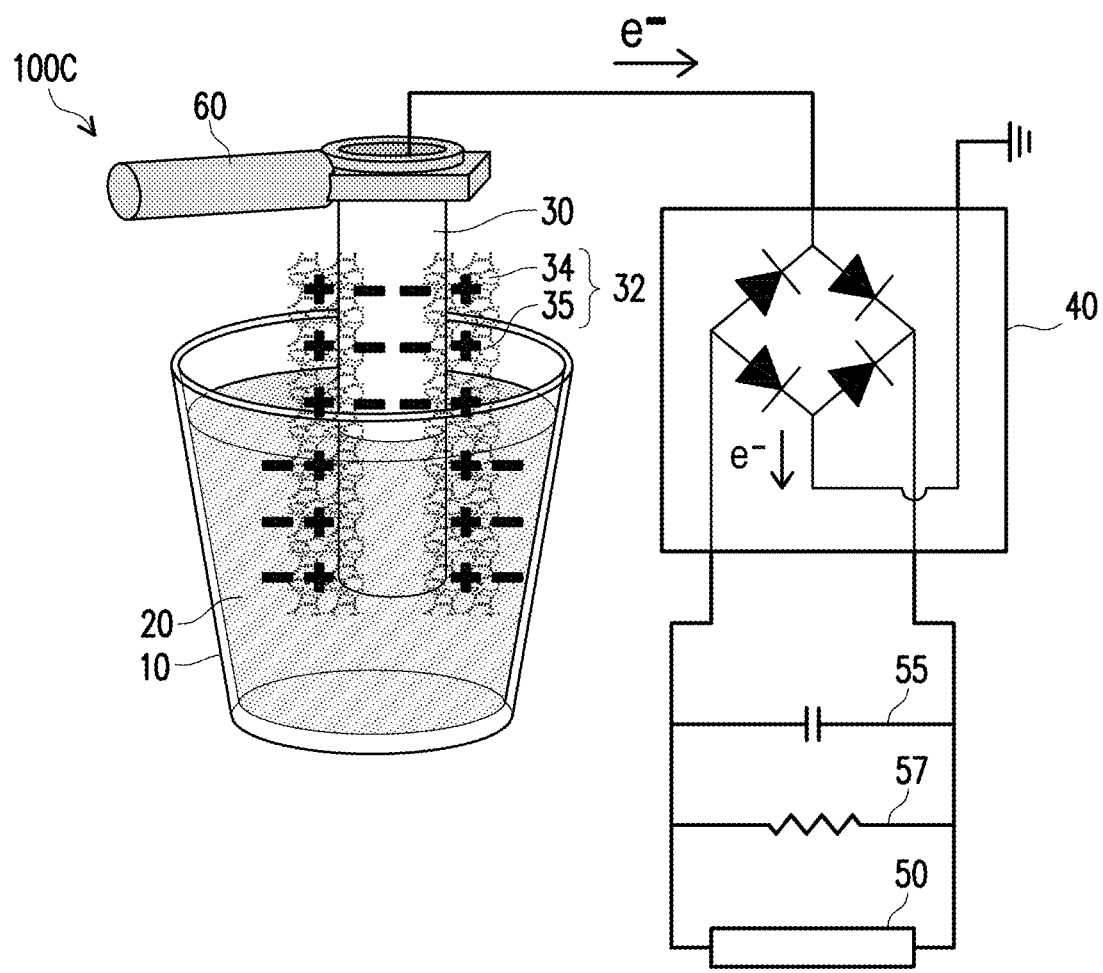
Figure 2A:
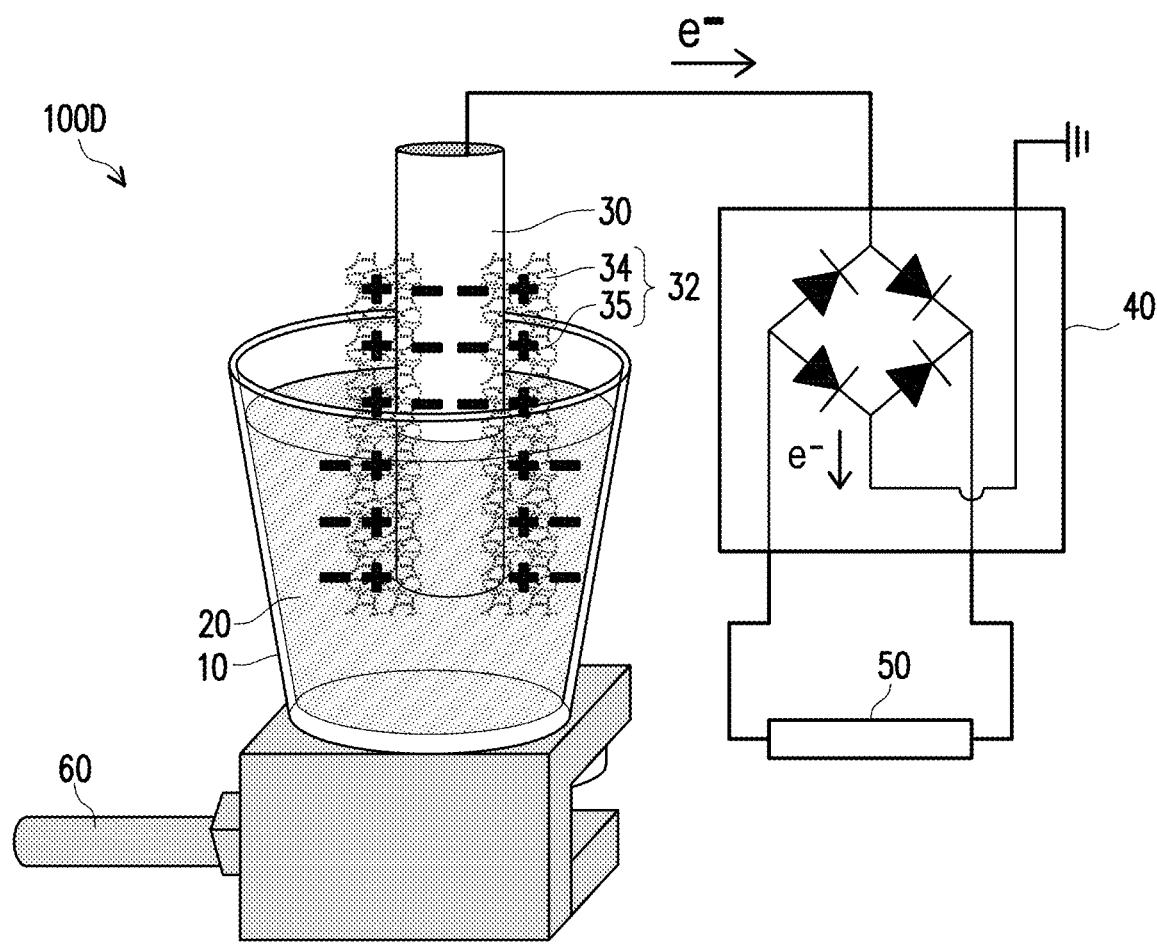
FIG. 2A to FIG. 2C are schematic diagrams of several solid-liquid contact electrification-based self-driving chemical sensors of some other embodiments of the invention.
Figure 2B:
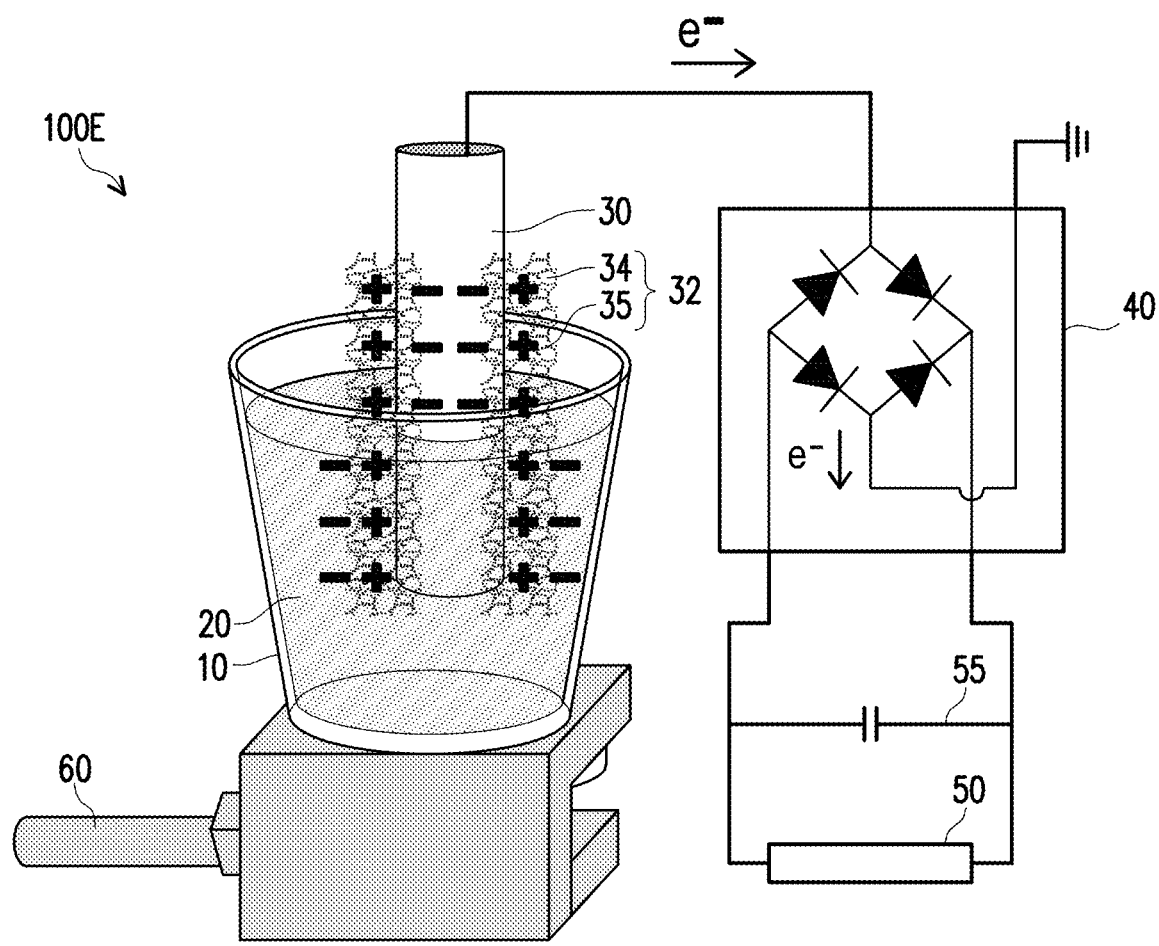
Figure 2C:
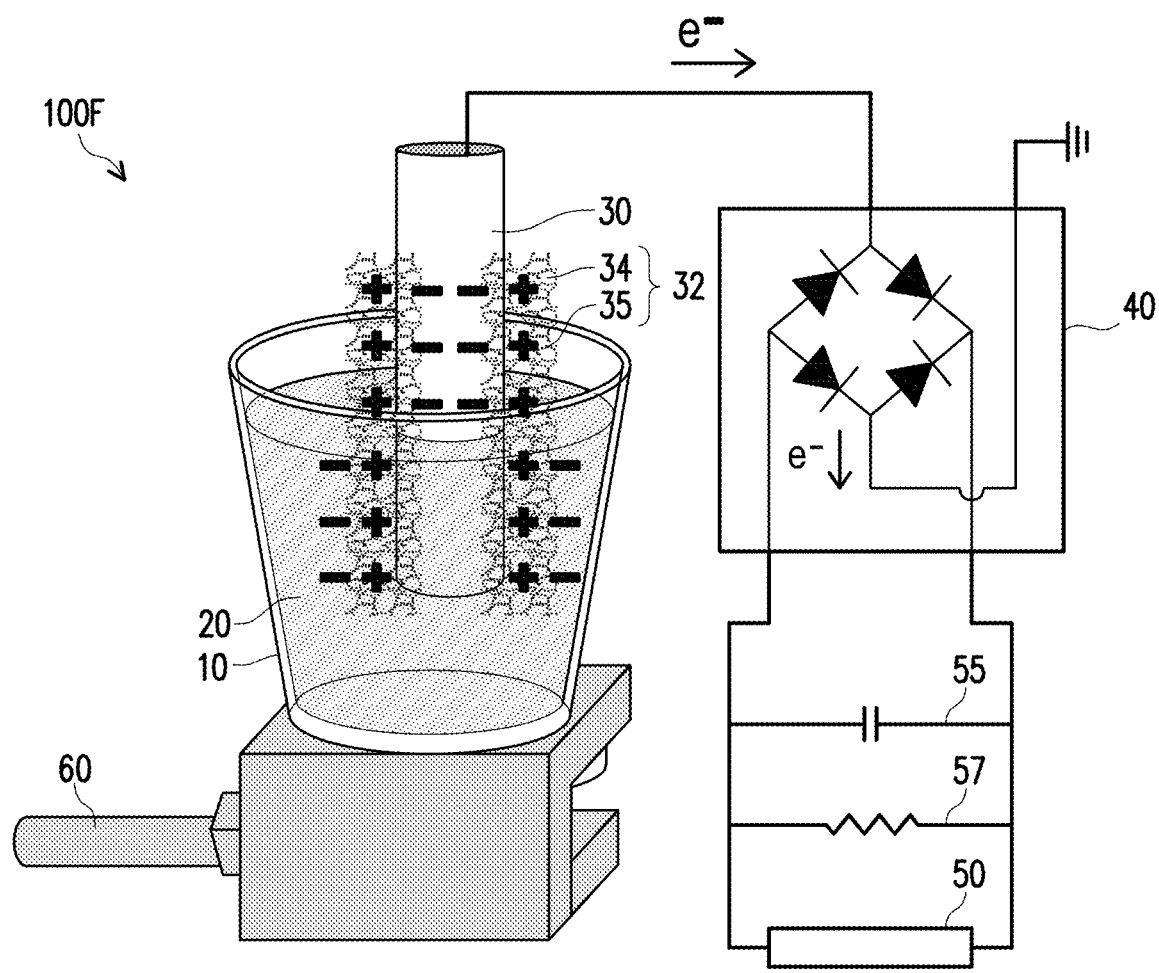

FIG. 1A to FIG. 1C are schematic diagrams of several solid-liquid contact electrification-based self-driving chemical sensors of the embodiments of the invention. FIG. 2A to FIG. 2C are schematic diagrams of several solid-liquid contact electrification-based self-driving chemical sensors of some other embodiments of the invention.

FIG. 1A shows a solid-liquid contact electrification-based self-driving chemical sensor 100A of an embodiment of the invention. The solid-liquid contact electrification-based self-driving chemical sensor 100A is a self-powered chemical sensor, wherein a battery or an external quantity conversion circuit is not needed for sensing. The solid-liquid contact electrification-based self-driving chemical sensor 100A is, for example, a solid-liquid contact triboelectric nanogenerator-based chemical sensor (TENS). The solid-liquid TENS is taken as an example below to illustrate the solid-liquid contact electrification-based self-driving chemical sensor 100A of the invention. For simplicity, the solid-liquid contact electrification-based self-driving chemical sensor 100A is referred to as the chemical sensor 100A for short.

The chemical sensor 100A of an embodiment of the invention includes a container 10, a contact liquid 20, an electrode 30, a solid triboelectric layer 32, a rectifier 40, a load 50, and a displacement device 60. The chemical sensor 100A may detect various target analytes by changing the material of a sensing layer 34 of the solid triboelectric layer 32. The target analytes may include catechin, metal ions such as $Hg^{2+}$, proteins, or dopamines, etc.

The container 10 may be used to contain the contact liquid 20 and the electrode 30. The container 10 may be selected from a material that does not chemically react with the contact liquid 20 and the electrode 30, such as glass, polymer, or a combination thereof. In FIG. 1A, the container 10 is cylindrical, but the invention is not limited thereto. The container 10 may have any shape.

The contact liquid 20 is placed in the container 10. The contact liquid 20 may be in a reciprocating motion of contact and separation with the solid triboelectric layer 32 to generate charge transfer, thereby generating an electrical output signal. Since the liquid has the ability to deform the shape thereof without applying force, complete contact with the surface of the solid triboelectric layer 32 may be ensured during the contact charging process, thus significantly enhancing the output signal. In addition, the contact liquid 20 as a contact material may also act as a good lubricant and promote the smooth movement of the solid triboelectric layer during the contact and separation operation, thus further improving the durability of the sensor 100A. The contact liquid 20 may be a hydrophilic solvent or a hydrophobic solvent. The contact liquid 20 is, for example, water, an organic solvent, or a buffer solution. The organic solvent is, for example, a highly volatile organic solvent that is more volatile than water, such as ethanol, acetone, or a combination thereof. The highly volatile solvent has a high evaporation rate and may be evaporated quickly, thus helping the chemical sensor 100A to obtain a higher triboelectric output. The buffer solution may be an aqueous salt solution, such as an aqueous sodium chloride solution or phosphate buffered saline (PBS).

The electrode 30 is, for example, in the shape of a column, a sheet, a strip, a rod, a wire, or a combination thereof. The material of the electrode 30 is, for example, a metal or an alloy. The metal may be titanium, gold, silver, platinum, aluminum, nickel, copper, tantalum, chromium, selenium, or an alloy thereof. The chemical sensor 100A of an embodiment of the invention may include a single electrode 30 or a plurality of electrodes 30. In an embodiment in which the chemical sensor 100A includes a plurality of electrodes 30, the plurality of electrodes 30 may be placed on a substrate (not shown). Here, a single electrode 30 is used for explanation. The solid triboelectric layer 32 covers the surface of the electrode 30. In some embodiments, the solid triboelectric layer 32 covers the sidewall of the electrode 30. The solid triboelectric layer 32 and the electrode 30 may be immersed in the contact liquid 20, and surface charge transfer occurs via their contact with each other. Since the surface charge transfer between various solid triboelectric layers 32 and the contact liquid 20 is different, the voltage output generated is also different. Therefore, in an embodiment of the invention, the solid triboelectric layer 32 and/or the contact liquid 20 may be changed to sense various target analytes. The solid triboelectric layer 32 includes the sensing layer 34 and a reacted sensing layer (or sensing layer for short) 35 formed by reacting with the target analytes.

The sensing layer 34 is, for example, a microstructure or a nanostructure. The microstructure or nanostructure is, for example, a nanosheet, a nanoparticle, a nanopowder, a nanofiber (nanotube, nanowire), a nanorod, a nanoflower, a nanogroove, a microgroove, a nanocone, a microcone, a nanoball, a microball, or a combination thereof. The selection of the material of the sensing layer 34 is related to the target analytes (or referred to as target molecules). The sensing layer 34 forms the reacted sensing layer 35 via the interaction with the target analytes. For example, the target analytes may be adsorbed with the sensing layer 34 to be adsorbed on the sensing layer 34, thereby affecting the interface charge transfer phenomenon in contact charging, and causing a corresponding change in the output signal. The material of the sensing layer 34 is reacted with the target analytes to change the work function or the hydrophilicity/hydrophobicity. That is, the work function or the hydrophilicity/hydrophobicity of the reacted sensing layer 35 is altered from the work function or the hydrophilicity/hydrophobicity of the sensing layer 34. In some embodiments, the work function of the reacted sensing layer 35 is lower than the work function of the sensing layer 34. In some other embodiments, the work function of the reacted sensing layer 35 is higher than the work function of the sensing layer 34. In some embodiments, the sensing layer 34 is hydrophilic, and the reacted sensing layer 35 is hydrophobic. In some other embodiments, the sensing layer 34 is hydrophobic, and the reacted sensing layer 35 is hydrophilic.

The sensing layer 34 may be an unmodified material. The unmodified material may itself sense the target analytes. The unmodified material is, for example, a metal, a metal oxide, a semiconductor, or a combination thereof. The sensing layer 34 may be a modified material. The modified material means that the material is used as the sensing layer 34 only after modifying the surface of the target analytes 36. The modified material is, for example, a modified metal, a modified metal oxide, a modified semiconductor, or a combination thereof.

In some embodiments, the sensing layer 34 includes an unmodified material, such as a metal oxide such as titanium oxide ($TiO_2$), tantalum oxide ($TaO_2$), manganese oxide, chromium oxide, iron oxide, copper oxide, zinc oxide, $BiO_2$, $Y_2O_3$, or a combination thereof. The metal atom of the metal oxide may be the same as or different from the metal atom of the electrode 30. For example, the electrode 30 is titanium; and the material of the metal oxide may be titanium oxide. In some exemplary embodiments, the target analytes are catechin, the sensing layer 34 is a titanium oxide nanosheet array, and the electrode 30 is titanium. Catechin is an electron-donating enediol ligand of catechin, and has a very strong binding affinity to surface Ti atoms. Therefore, the catechin and the surface of the $TiO_2$ NS form a ligand-to-metal charge transfer complex to serve as the reacted sensing layer 35.

In some other embodiments, the sensing layer 34 includes an unmodified material, such as a metal such as Te. In some exemplary embodiments, the target analytes are $Hg^{2+}$ ions, and the sensing layer 34 is a Te nanowire array (TeNWs). TeNWs has a strong binding affinity for $Hg^{2+}$ ions. Therefore, TeNWs may selectively capture $Hg^{2+}$ ions and form a HgTe layer on the surface of TeNWs. The HgTe layer and TeNWs together serve as the sensing layer 35, which may be expressed as HgTeNWs.

In still some other embodiments, the target analytes 36 are proteins or nucleic acids, and the sensing layer 34 includes a modified material. For example, the target analytes 36 are bacteria, such as E. coli, and the modified material is, for example, D-mannose sulfhydryl-modified gold. In some exemplary embodiments, the target analytes 36 are the FimH protein of type I fimbriae in E. coli, and the sensing layer 34 is a D-mannose sulfhydryl-modified gold nanoparticle array. D-mannose-containing glycoprotein receptors may selectively bind to the FimH protein of type I fimbriae in E coli. That is, the D-mannose sulfhydryl-modified gold nanoparticle array 34 is reacted with the FimH protein of type I fimbria to form the reacted sensing layer 35. Type I fimbriae are filamentous protein attachments that extend from the surface of many Gram-negative organisms and consist of FimA, FimF, FimG, and FimH proteins. FimA accounts for more than 98% of the fimbriae protein, and FimH is solely responsible for binding to D-mannose. The interaction between FimH and receptors expressed on the surface of the bladder epithelial cavity is critical to the ability of many UPEC strains to colonize the bladder and cause disease. Adhesin FimH binds to D-mannose-containing glycoprotein receptors and not only mediates bacterial adhesion, but also mediates uroplakin receptors in human urothelial cells, which are present in the differentiated cells of the urothelial cells. The progression of the infection mainly occurs due to the bacterial colonization of the bladder owing to the strong interaction between FimH and specific receptors on the bladder surface. Therefore, the detection of FimH proteins may be used to confirm whether the test solution contains E. coli.

Referring to FIG. 1A, in some embodiments, the electrode 30 of the solid-liquid contact electrification-based self-driving chemical sensor 100A is connected in series with the rectifier 40, and the rectifier 40 is connected in parallel with the load 50. The rectifier 40 is, for example, a bridge rectifier. The bridge rectifier may be composed of diodes connected in series from head to tail. In the example shown in the figure, the node of the upper two diodes is the electrode 30 connected to the solid triboelectric layer 32, and the node of the upper two diodes is grounded. In this way, a current path between the induced charge on the electrode 30 and the ground is provided. The other two nodes of the bridge rectifier are connected to the load 50 as the entire circuit. Via the potential difference between the electrode 30 and the ground, the direction of the current flowing through the bridge rectifier 40 may be determined.

Referring to FIG. 1B, in some other embodiments, a solid-liquid contact electrification-based self-driving chemical sensor 100C further includes a capacitor 55. The capacitor 55 is connected in parallel with the rectifier 40 and the load 50. The capacitor 55 may be used as a filter to stabilize the electrical output signal.

Referring to FIG. 1C, in yet some other embodiments, a solid-liquid contact electrification-based self-driving chemical sensor 100C further includes a resistance 57. The resistance 57 is located between the capacitor 55 and the load 50 and is connected in parallel with the capacitor 55, the rectifier 40, and the load 50. The resistance 57 may prevent the no-load voltage from being too high under the action of a filter (the capacitor 55) to achieve the effect of voltage regulation.

The displacement device 60 is, for example, a swing oscillator. With the displacement device 60, the electrode 30 may be actively or passively immersed in or emerged from the contact liquid 20. The displacement device 60 may be connected to the electrode 30 or connected to the container 10, so that a periodic reciprocating motion of contact and separation may be performed on the solid triboelectric layer 32 and the contact liquid 20, thereby generating a surface charge transfer to generate an electrical output signal.

Referring to FIG. 1A to FIG. 1C, in some embodiments, the position of the container 10 of the solid-liquid contact electrification-based self-driving chemical sensors 100A, 100B, and 100C is fixed; and the displacement device 60 is connected to the electrode 30 to change the position of the electrode 30, and by performing a periodic reciprocating motion, multiple cycles of immersion and removal may be performed on the electrode 30 covered by the solid triboelectric layer 32 and the contact liquid 20, thereby generating a surface charge transfer to generate an electrical output signal.

Referring to FIG. 2A to FIG. 2C, in some other embodiments, the position of the electrode 30 in solid-liquid contact electrification-based self-driving chemical sensors 100D, 100E, and 100F is fixed; and the displacement device 60 is connected to the container 10 to change the position of the container 10, and via a periodic reciprocating motion, multiple cycles of contact and separation may be performed on the contact liquid 20 and the solid triboelectric layer 32, thereby generating a surface charge transfer to generate an electrical output signal.

However, the invention is not limited thereto. In other embodiments, a displacement device (not shown) may be connected to the electrode 30 and the container 10, so that the electrode 30 and the container 10 are moved at the same time to perform a periodic reciprocating movement. This allows the contact liquid 20 to perform multiple cycles of contact and separation with the electrode 30 covered with the solid triboelectric layer 32, thereby generating a surface charge transfer to generate an electrical output signal.

The output response of the chemical sensor of an embodiment of the invention is generated based on two consecutive phenomena, namely contact electrification and electrostatic induction. Contact electrification promotes the process of generating static and polarized surface charges, while electrostatic induction plays an indispensable role in inducing charges on the electrodes, wherein electrons are subsequently driven under the developed voltage difference. FIG. 3A to FIG. 3D show schematic diagrams of the operation flow of a solid-liquid contact electrification-based self-driving chemical sensor of an embodiment of the invention. FIG. 3A to FIG. 3D only show a single electrode solid-liquid contact electrification-based self-driving chemical sensor, but the invention is not limited thereto.

Figure 3A:
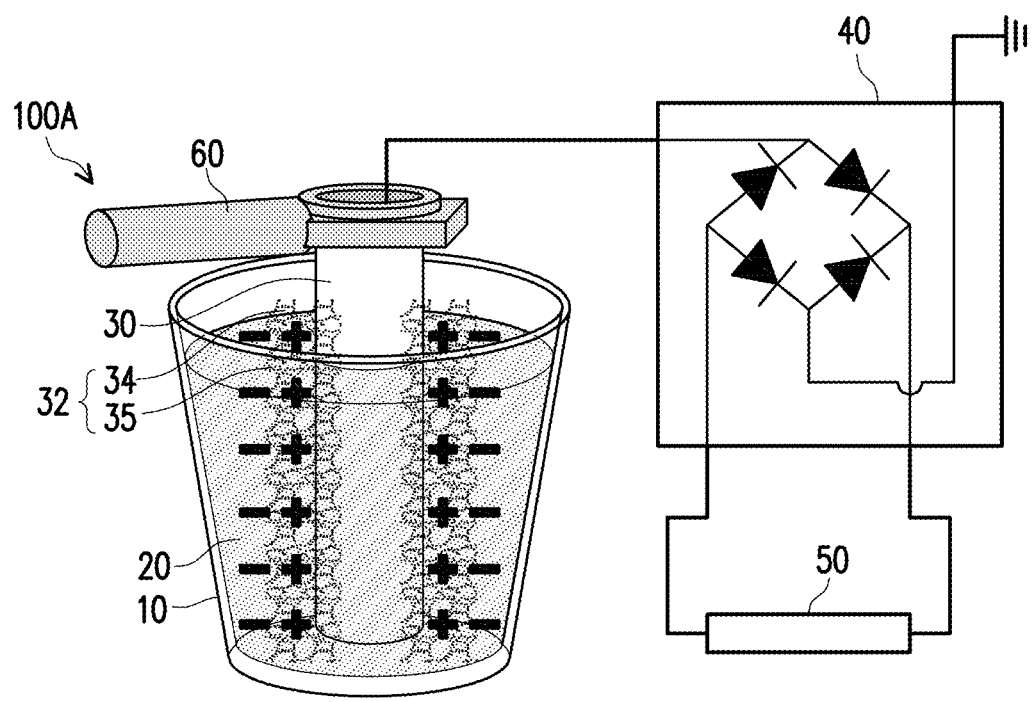
FIG. 3A to FIG. 3D show schematic diagrams of the operation flow of a solid-liquid contact electrification-based self-driving chemical sensor of an embodiment of the invention.

Referring to FIG. 3A, the electrode 30 with the solid triboelectric layer 32 of the chemical sensor 100A of an embodiment of the invention is placed in the container 10 and is in contact with the contact liquid 20 in the container 10. A surface charge transfer is generated between the solid triboelectric layer 32 and the contact liquid 20. In the present embodiment, electrons are transferred from the solid triboelectric layer 32 to the contact liquid 20, so that the solid triboelectric layer 32 is positively charged and the contact liquid 20 is negatively charged. In order to maintain electrical neutrality, an electrical double layer (EDL) is generated on the surface of the contact liquid 20.

Figure 3B:
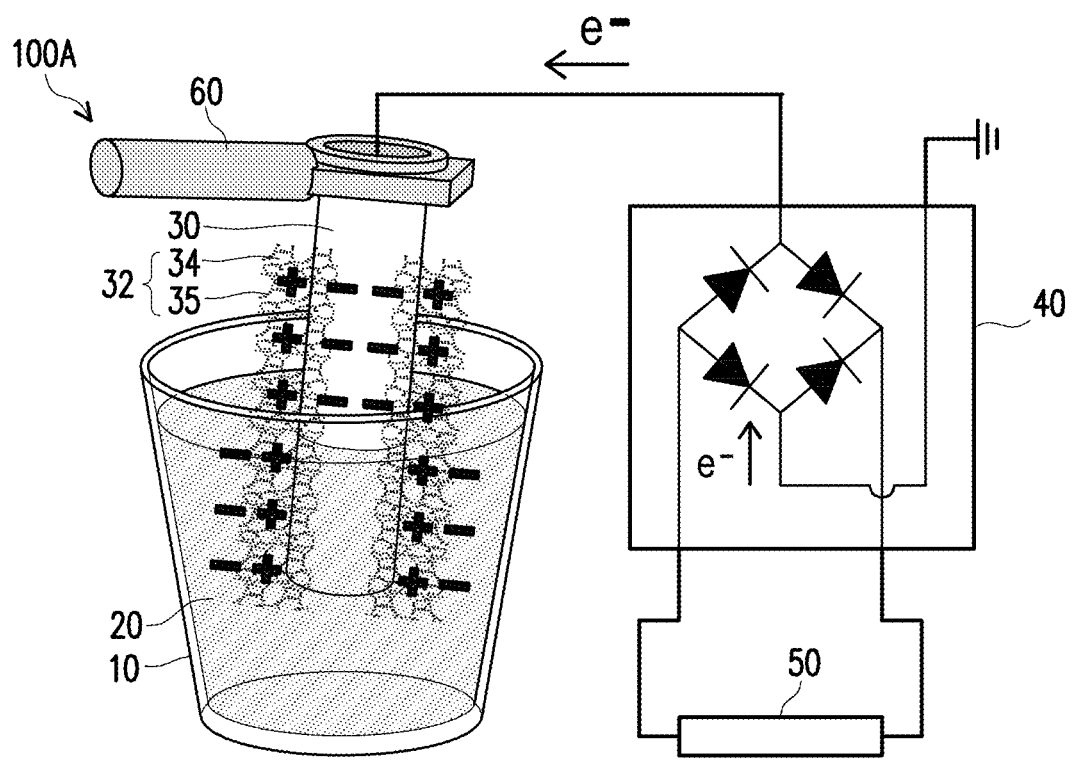

Referring to FIG. 3B, with the displacement device 60, the solid triboelectric layer 32 covering the electrode 30 slowly leaves the container 10 and is partially separated from the contact liquid 20. After the surface charge of the solid triboelectric layer 32 is partially separated from the contact liquid 20, an opposite charge (i.e., negative charge) is induced on the electrode 30 to maintain electrical neutrality. Therefore, a potential difference is generated between the electrode 30 and the ground, thus promoting the flow of electrons from the ground to the electrode 30 via an external circuit, thereby generating a positive output current.

Figure 3C:
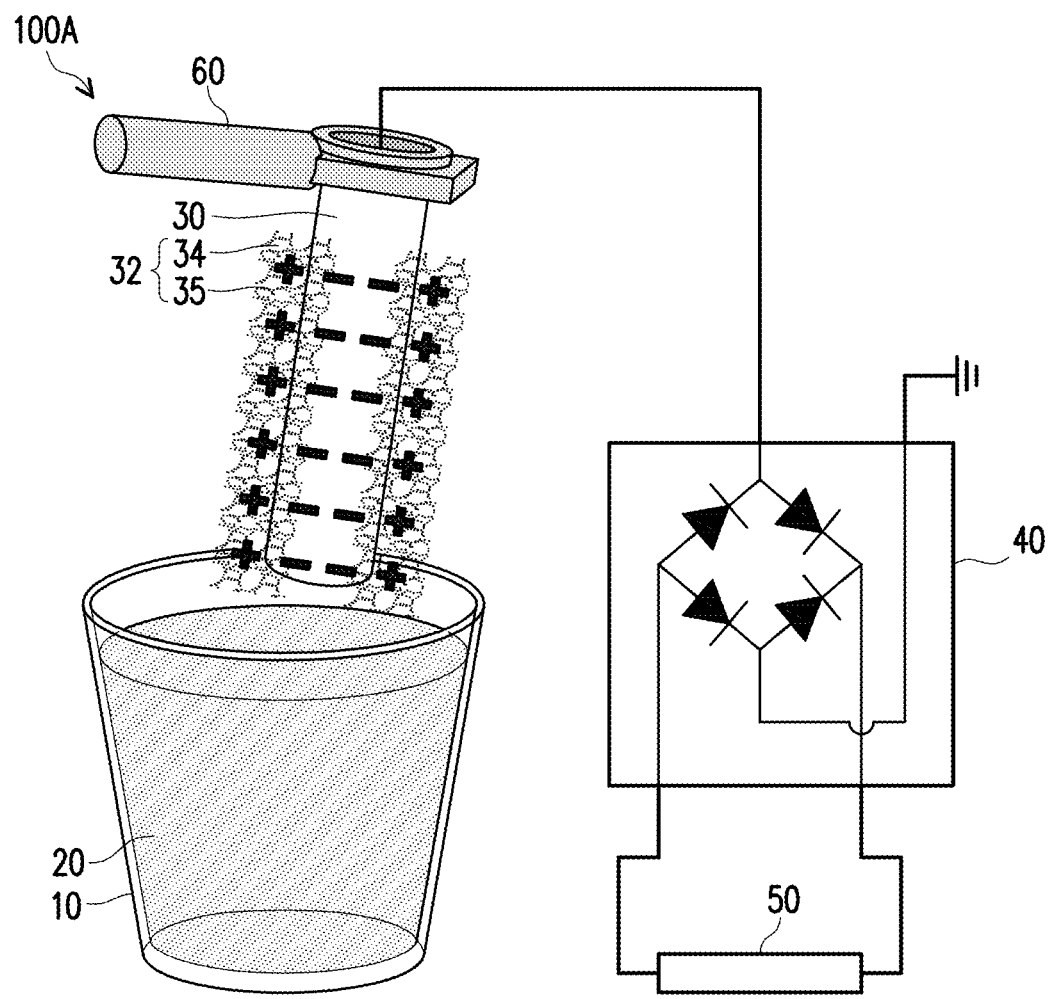

Referring to FIG. 3C, the solid triboelectric layer 32 covering the electrode 30 completely leaves the container 10 by the displacement device 60, and is completely separated from the contact liquid 20. In order to maintain electrical neutrality, after the surface charge of the solid triboelectric layer 32 is completely separated from the contact liquid 20, all the opposite charges (i.e., negative charge) is induced on the electrode 30. Therefore, the potential difference between the electrode 30 and the ground reaches a maximum.

Figure 3D:
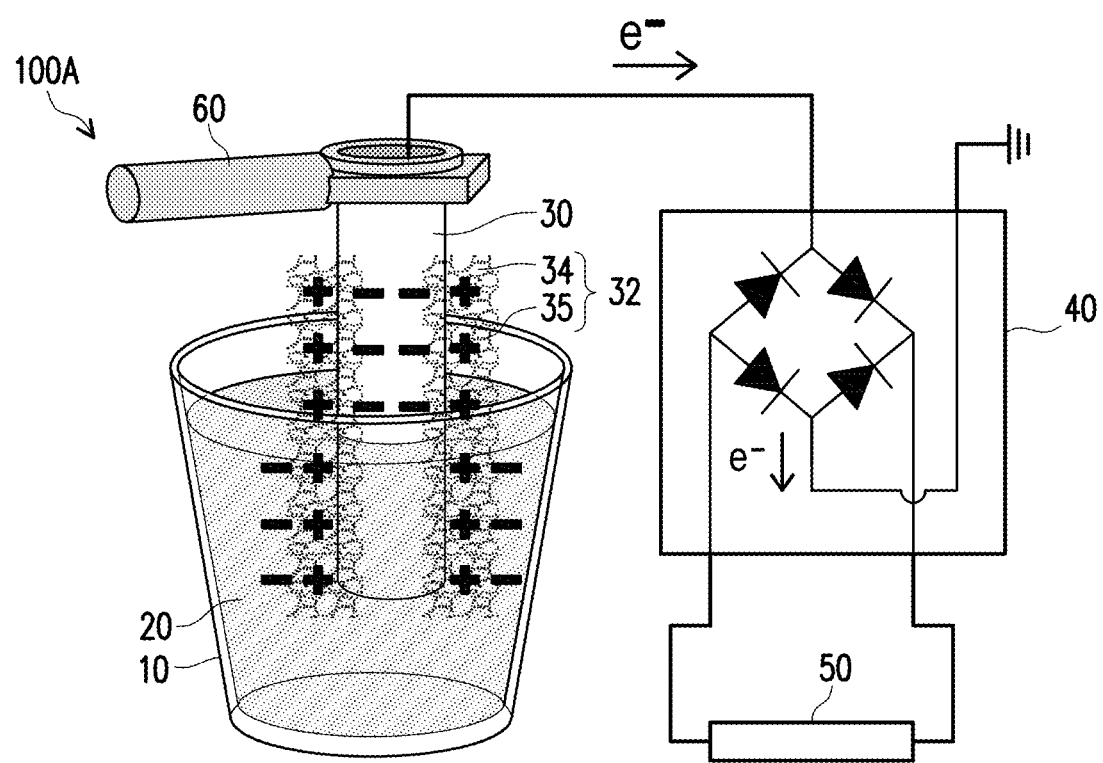

Referring to FIG. 3D, in the next cycle, the solid triboelectric layer 32 covering the electrode 30 gradually enters the container 10 via the displacement device 60, and the solid triboelectric layer 32 starts to establish contact with the contact liquid 20 again. As the charge induced on the electrode 30 is gradually moved back to the ground, the potential difference is gradually reduced. As a result, current flows through the external circuit in the opposite direction.

Referring back to FIG. 3A, when the solid triboelectric layer 32 covered on the electrode 30 completely enters the container 10 via the displacement device 60, the solid triboelectric layer 32 is in complete contact with the contact liquid 20. The charge induced on the electrode 30 is almost completely moved back to the ground, thus causing the potential difference between the electrode and the ground to be zero, so that the operation is initialized again. With the displacement device 60, the solid triboelectric layer 32 covered on the electrode 30 is slid up and down in the contact liquid 20, so that the solid triboelectric layer 32 and the contact liquid 20 are continuously contacted and separated periodically and repeatedly, thereby generating a series of output voltage cycles.

In an embodiment of the invention, the triboelectric output generated by the chemical sensor 100A has different effects due to the adsorption situation of the target analytes (test objects) on the surface of the solid triboelectric layer 32. The target analytes adsorbed on the surface of the chemical sensor 100A affect the surface characteristics of the solid triboelectric layer 32, such as surface wettability (hydrophilicity/hydrophobicity), surface charge density, and work function, thus changing the degree of contact electrification between the contact liquid 20 and the solid triboelectric layer 32. Therefore, the triboelectric output varies with the concentration of the target analytes 36 correspondingly.

In this regard, the surface free energy of the solid triboelectric layer 32 may be systematically adjusted according to the adsorption of certain specific chemical substances, resulting in different wetting states. In some embodiments, if the surface is more hydrophilic, more of the contact liquid 20 is adhered to the solid triboelectric layer 32, so that the oppositely charged ions are adsorbed to the contacted surface and shield the triboelectric charge on the solid triboelectric layer 32, thereby causing the output voltage to drop. Moreover, some chemical substances may also adjust the surface charge density of the solid triboelectric layer 32 by changing the number of charge-carrying locations and changing the chemical properties of these locations to change the tendency of these locations to gain or lose electrons. Therefore, the output voltage is changed accordingly.

In addition, some chemical substances and their respective identifying elements are bound to the surface of the solid triboelectric layer 32 to change the surface potential, thus further regulating the electron transfer process. This mechanism may be quantified according to work function. Therefore, reduction of the work function may promote the enhancement of electron transfer in the contact electrification process, overcoming the surface barrier, and vice versa. Therefore, the change in the work function significantly affects the potential difference generated between the electrode 30 and the contact liquid 20.

FIG. 4A to FIG. 4D show schematic diagrams of the operation flow of a solid-liquid contact electrification-based self-driving chemical sensor of another embodiment of the invention.

The chemical sensor 100D of FIG. 4A to FIG. 4D has a similar functioning principle to the chemical sensor 100A of FIG. 3A to FIG. 3D, which is not repeated herein. The difference between the two is that the chemical sensor 100D of FIG. 4A to FIG. 4D moves the position of the container 10 via the moving device 60 so that the contact liquid 20 in the container 10 is in contact with and separated from the solid triboelectric layer 32.

Figure 4A:
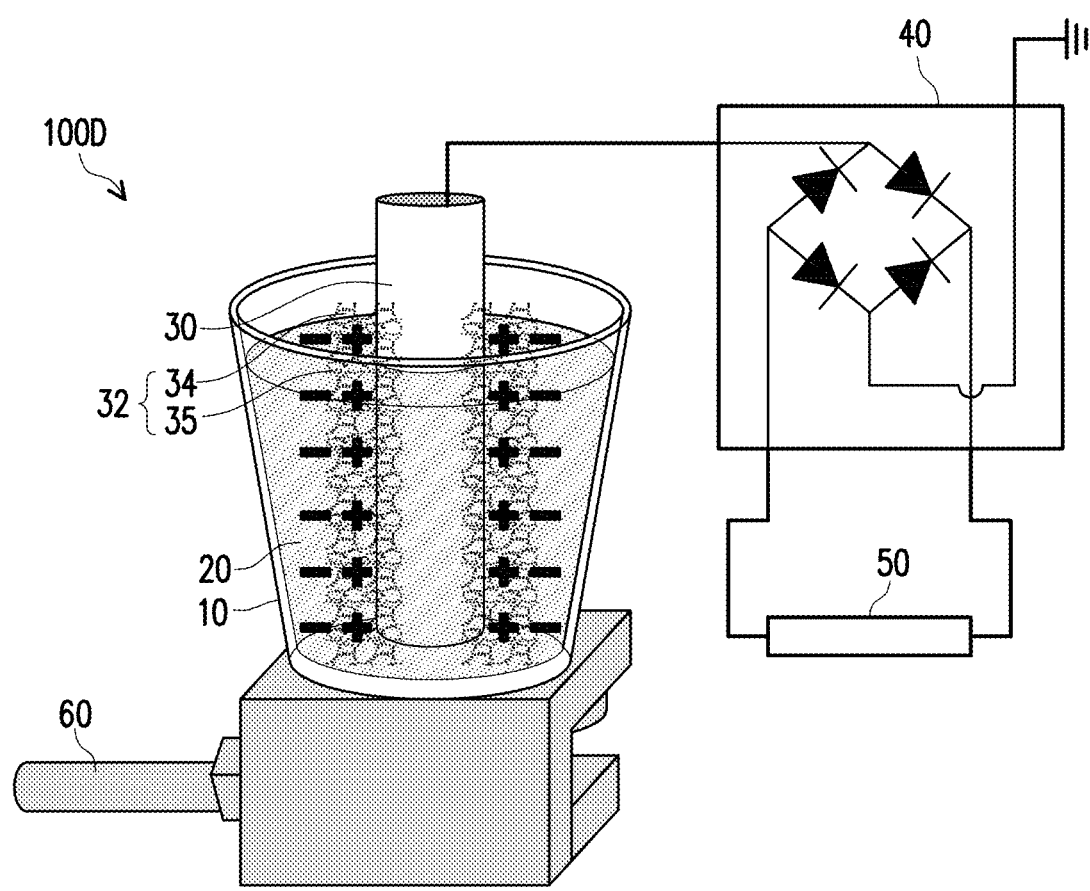
FIG. 4A to FIG. 4D show schematic diagrams of the operation flow of a solid-liquid contact electrification-based self-driving chemical sensor of another embodiment of the invention.
Figure 4B:
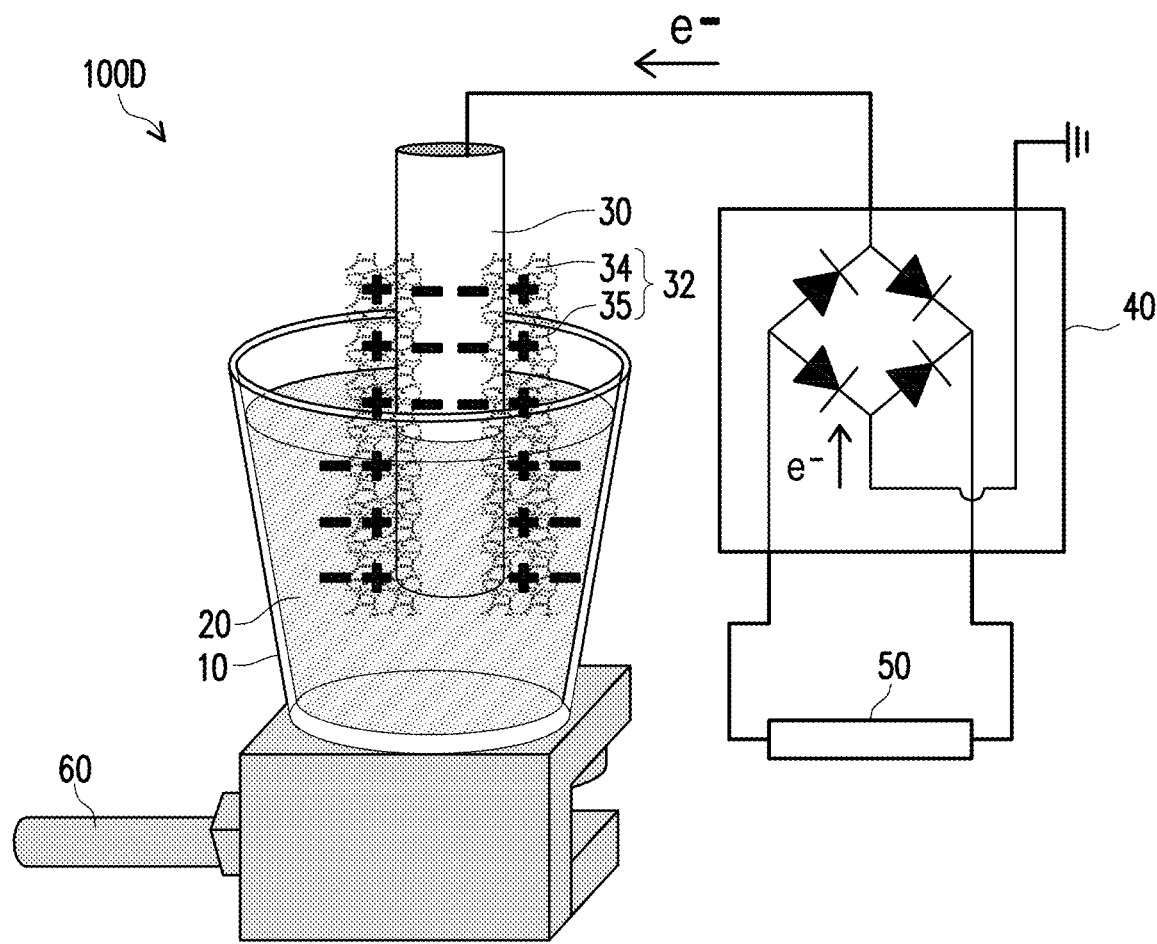
Figure 4C:
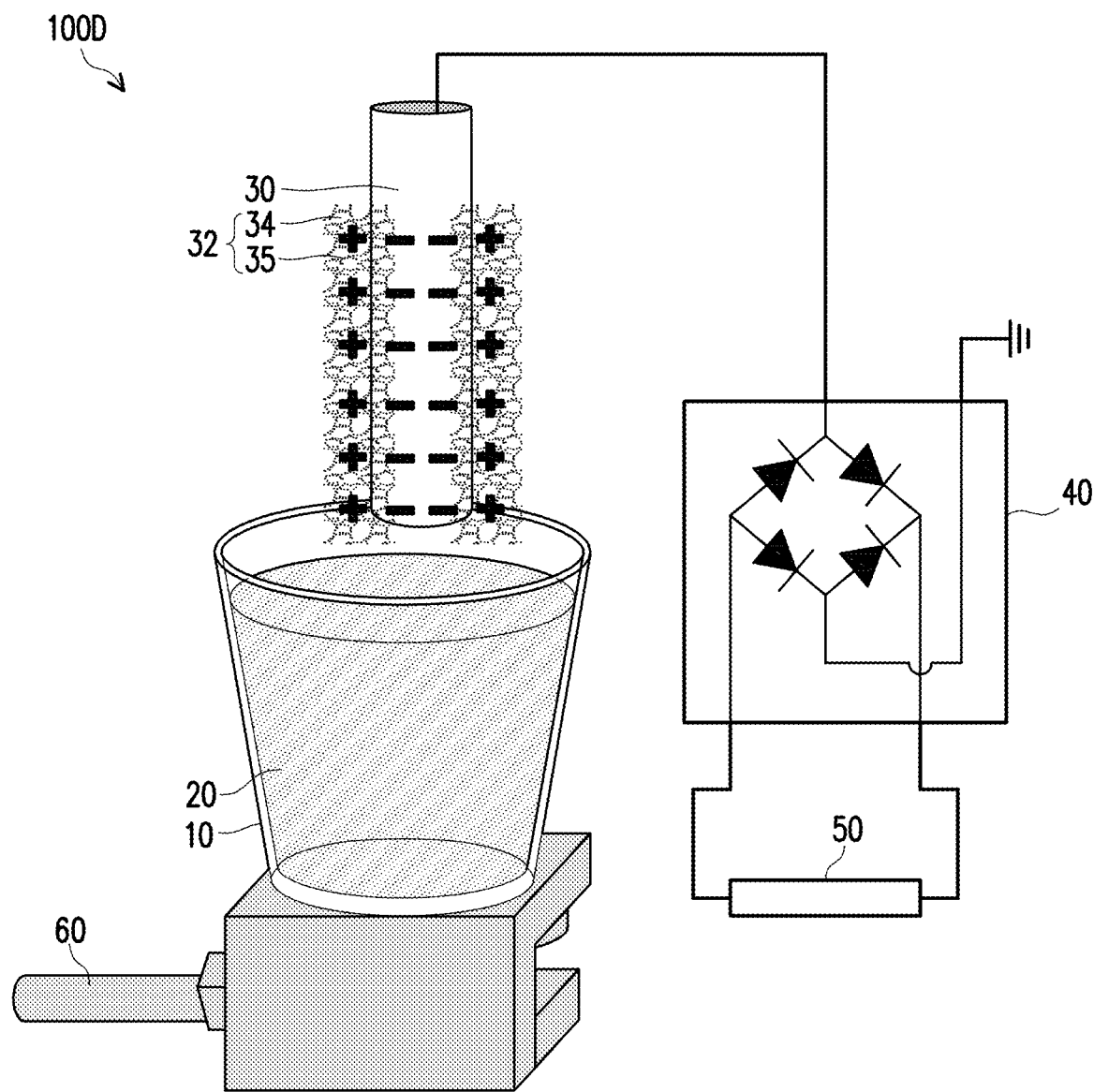
Figure 4D:
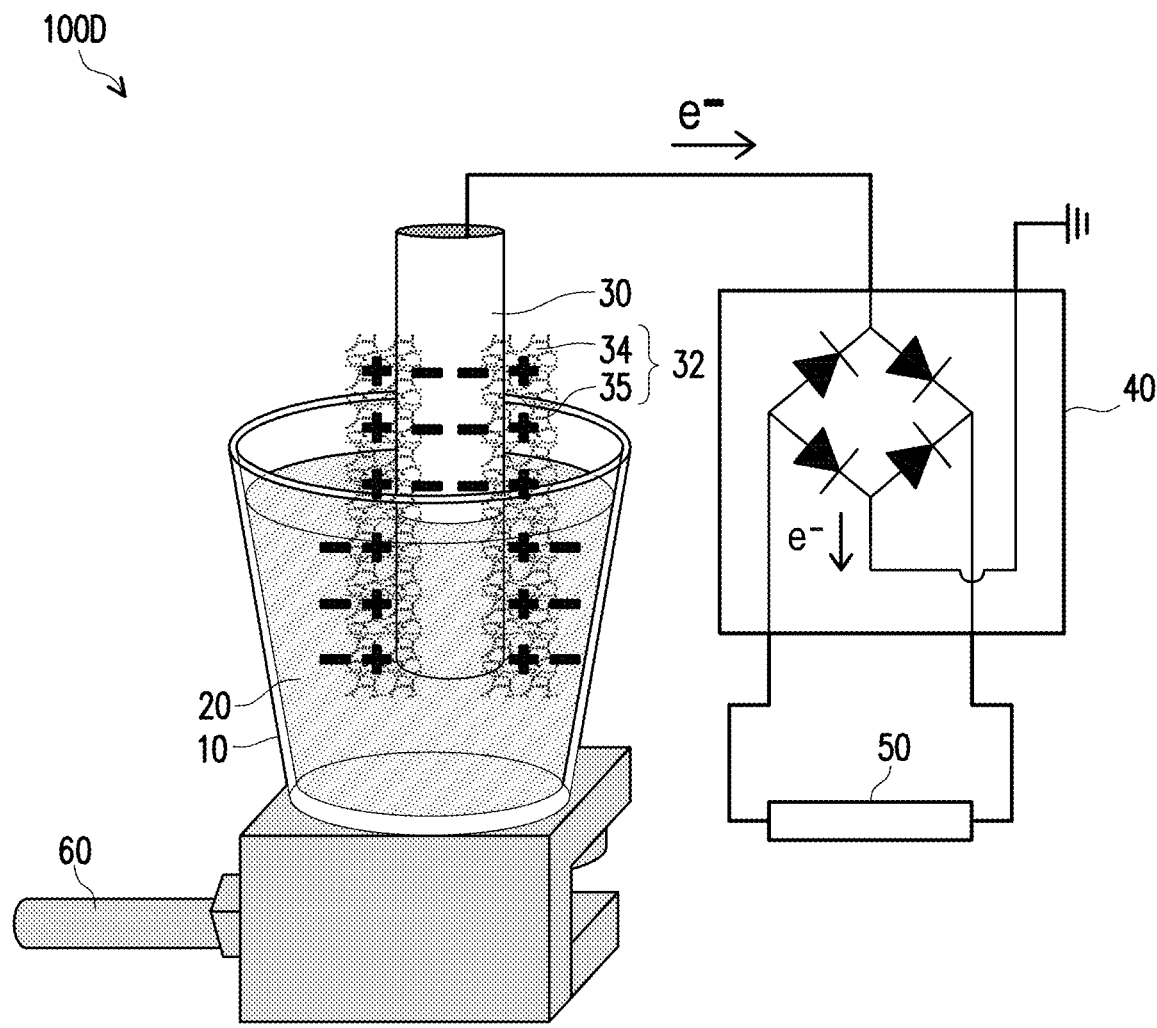

First, the container 10 is lifted by the displacement device 60, so that the contact liquid 20 and the solid triboelectric layer 32 are in complete contact, as shown in FIG. 4A. Then, the container 10 is gradually lowered by the displacement device 60, so that the contact liquid 20 is partially separated from the solid triboelectric layer 32, as shown in FIG. 4B. Next, the container 10 is lowered again by the displacement device 60, so that the contact liquid 20 is completely separated from the solid triboelectric layer 32, as shown in FIG. 4C. In the next cycle, the container 10 is gradually lifted by the displacement device 60, so that the contact liquid 20 and the solid triboelectric layer 32 start to establish contact again, as shown in FIG. 4D.

Several experimental examples are given below to illustrate the solid-liquid chemical sensor of an embodiment of the invention. For comprehensive study of the morphology, structure, and chemical composition of the samples, the grown nanosheet arrays and nanosheet arrays for target analyte reaction were extensively characterized through various advanced techniques. For example, the phase purity and crystallinity of the grown samples were analyzed by using a powder X-ray diffractometer (XRD, Rigaku TTRAX III). The surface morphology of the as-prepared nanosheet arrays was characterized by using field emission scanning electron microscopy (FESEM, JEOL JSM-7600F) and cold-field emission scanning electron microscopy (SEM, Hitachi SU8010). Compositional analysis was carried out by X-ray photoelectron spectroscopy (ESCALAB 250 XI, Thermo Scientific). The X-ray photoelectron spectrometer was equipped with an Al Kα X-ray source and hemispherical analyzer. All binding energies were corrected for sample charging effect with reference to the C1s line at 284.6 eV, and the high-resolution core-level spectra were deconvoluted by using CASA XPS software. The work function of the synthesized samples was measured by ultraviolet photoelectron spectroscopy (UPS) using a He I (hv=21.2 eV) UV source under ultrahigh vacuum conditions. Moreover, the dimension and natural crystallinity of the grown samples were investigated by high-resolution transmission electron microscopy (HRTEM, JEOL-JEM-F200). Amplitude modulated Kelvin probe force microscopy (AM-KPFM) was employed to monitor the surface potential distribution of catechin-modified nanosheet arrays. Furthermore, a low-noise voltage preamplifier (such as the Stanford Research Systems Model SR560) was used to measure the output performance of the developed solid-liquid TENS.

The following Experimental examples 1-1 to 1-4 may be used to verify that the solid-liquid TENWS sensor of the invention may be used to detect catechin.

Experimental Example 1-1

<Preparation of $TiO_2$ Nanosheet Array and Reaction with Catechin>

FIG. 5A to FIG. 5F show schematic diagrams of the manufacturing process of a solid triboelectric layer of a solid-liquid contact electrification-based self-driving chemical sensor of an embodiment of the invention. For clarity, the following uses a titanium electrode, a $TiO_2$ nanosheet array, and catechin for illustration, but the invention is not limited thereto.

Figure 5A:
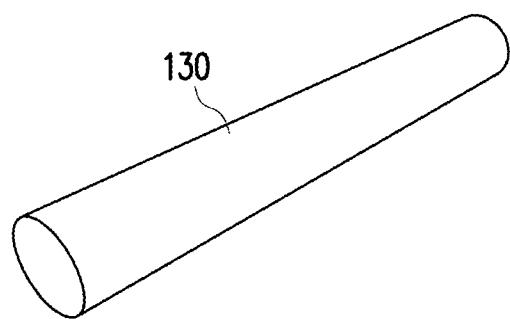
FIG. 5A to FIG. 5F show schematic diagrams of the manufacturing process of a solid triboelectric layer of a solid-liquid contact electrification-based self-driving chemical sensor of an embodiment of the invention.

Please refer to FIG. 5A, a titanium (Ti) wire 130 is provided as an electrode. Next, $TiO_2$ nanosheet arrays 134 are formed on the surface of the titanium wire 130, as shown in FIG. 5B to FIG. 5E.

Figure 5B:
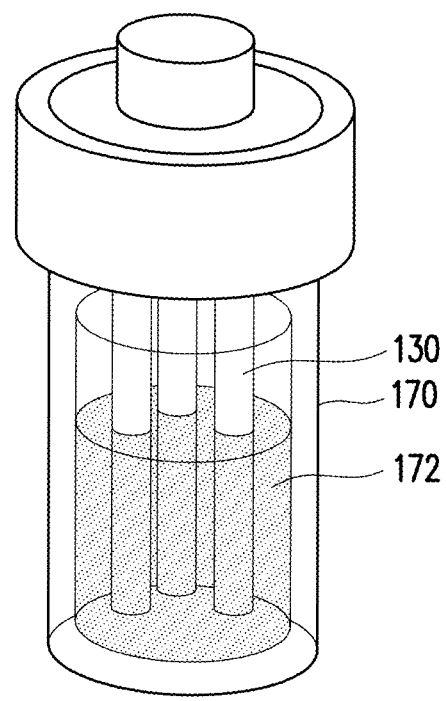
Figure 5C:
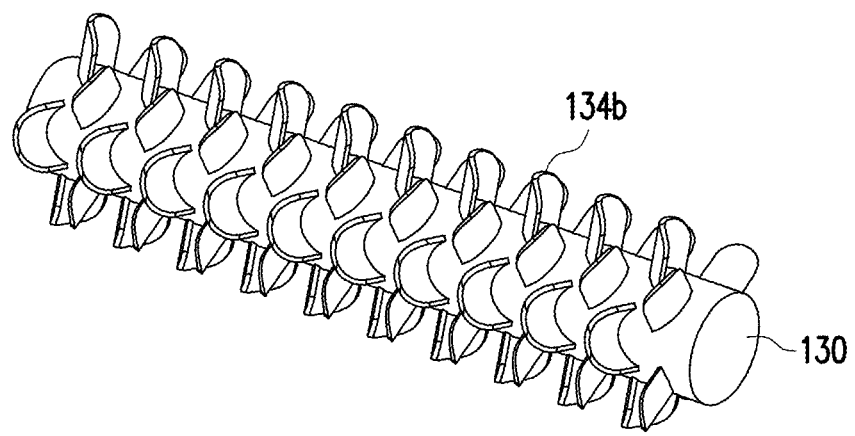

First, referring to FIG. 5B, the Ti wire 130 is cleaned ultrasonically in acetone, ethanol, and water sequentially for several minutes, such as 10 minutes. Next, a first hydrothermal process is performed on the titanium wire 130. In the first hydrothermal process, for example, the titanium wire 130 is placed in a Teflon-lined stainless-steel autoclave 170 filled with an alkaline solution 172, such as NaOH solution (0.2 M). Then, referring to FIG. 5C, the autoclave 170 is sealed and heated in an oven between 125° C. and 155° C., such as at 140° C., for more than 24 hours, which led to the reaction between the Ti wire 130 and the alkaline solution 172, resulting in densely grown $Na_2Ti_2O_4(OH)_2$ nanosheet arrays 134b on the surface of the Ti wire 130.

Figure 5D:
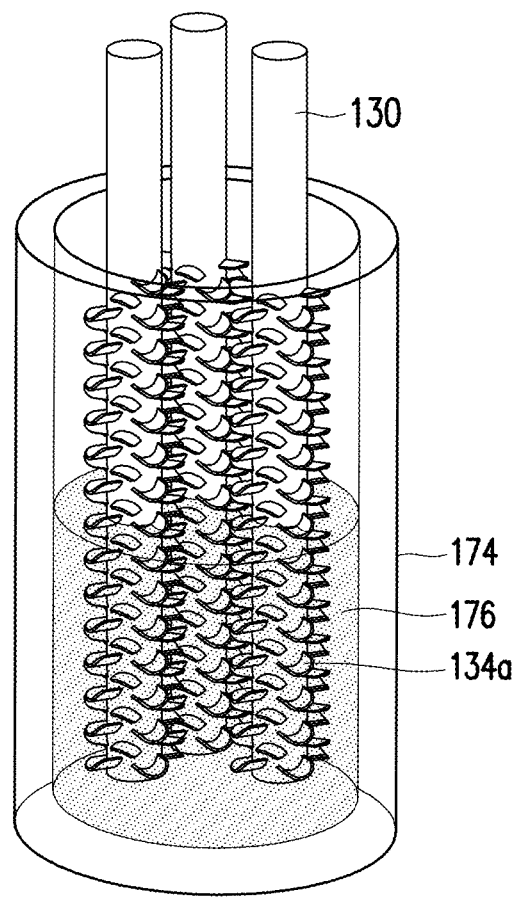

Referring to FIG. 5D, a substitution process is performed on the $Na_2Ti_2O_4(OH)_2$ nanosheet arrays 134b to form $H_2Ti_2O_4(OH)_2$ nanosheet arrays 134a. In the substitution process, for example, after first cooling and rinsing the $Na_2Ti_2O_4(OH)_2$ nanosheet arrays 134b in water, the Ti wire 130 is immersed in an acid solution 176 such as a Teflon-lined stainless-steel autoclave 174 filled with HCl solution (1 M) to react at room temperature (such as 15° C. to 35° C.) for several minutes such as 10 minutes to substitute $Na^+$ of the $Na_2Ti_2O_4(OH)_2$ nanosheet arrays 134b with $H^+$ via an ion exchange process, which leads to the formation of the $H_2Ti_2O_4(OH)_2$ nanosheet arrays 134a.

Figure 5E:
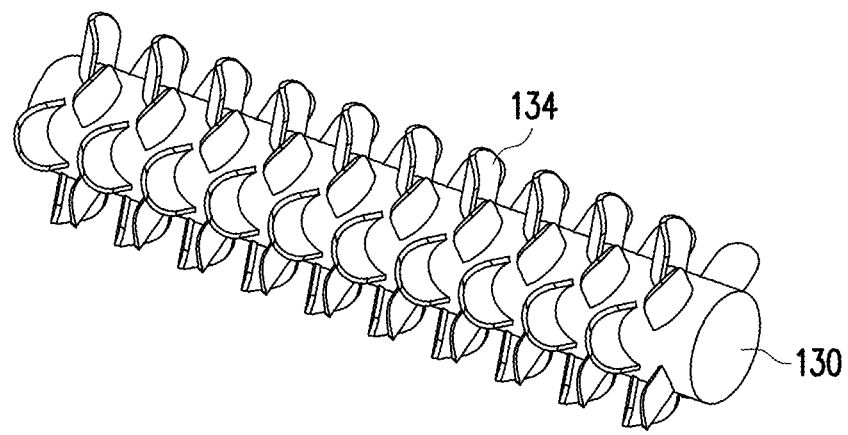

Referring to FIG. 5E, the titanium wire 130 formed with the $H_2Ti_2O_4(OH)_2$ nanosheet arrays 134a is rinsed again with water and dried at ambient temperature for several minutes to several hours. Then, a second hydrothermal process is performed on the titanium wire 130 to make the $H_2Ti_2O_4(OH)_2$ nanosheet arrays 132a react to form the $TiO_2$ nanosheet arrays 134. In the second hydrothermal process, for example, the titanium wire 130 is placed in an oven at a temperature between 300° C. and 600° C. (such as 500° C.) for calcination, as example for 3 hours. Then, analysis is performed by XRD, FESEM, and TEM, for example.

Figure 5F:
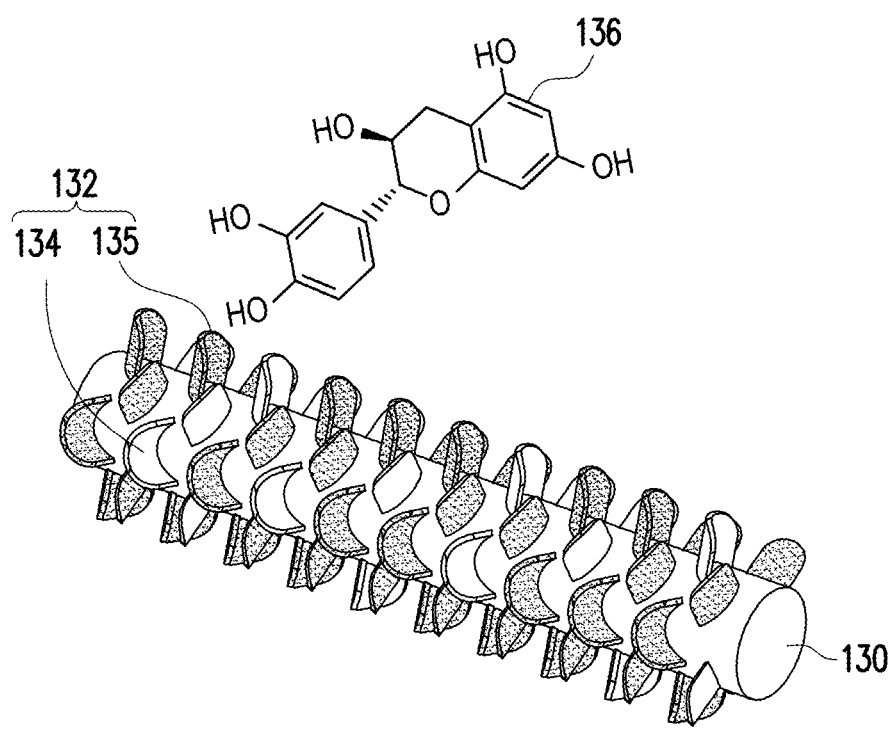

Referring to FIG. 5F, a reaction process is performed on the $TiO_2$ nanosheet arrays 134 with a target analyte 136, such as a catechin sample, to form catechin-reacted $TiO_2$ nanosheet arrays 135. In the reaction process, the titanium wire 130 with $TiO_2$ nanosheet arrays 132 may be immersed in the catechin solution to react for 1 hour to form the catechin-reacted $TiO_2$ nanosheet arrays 135. The reaction is as follows:

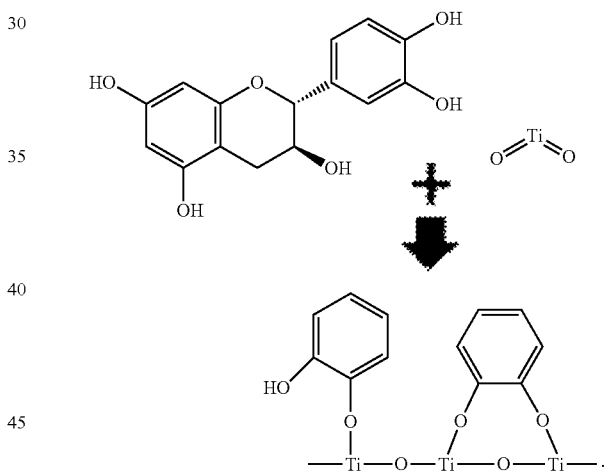

The $TiO_2$ nanosheet arrays 134 not reacted with catechins and the $TiO_2$ nanosheet arrays 135 reacted with catechins together serve as the solid triboelectric layer 132. After the reaction, the samples are dried at ambient temperature.

<Reaction with Catechin and Acetone as Contact Liquid>

In the present experimental example, the reaction process was based on various standard concentrations, such as 1 nM, 10 nM, 100 nM, 1 μM, 10 μM, 100 μM, 1 mM, and 10 mM catechin solutions for $TiO_2$ nanosheet arrays to form $TiO_2$ nanosheet arrays reacted with various standard concentrations of catechins as a part of various solid triboelectric layers 132.

The solid-liquid TENS was operated under a single-electrode configuration where the Ti wire and the ground acted as the electrodes. The as-synthesized $TiO_2$ nanosheet arrays and catechin-modified $TiO_2$ nanosheet arrays grown on the Ti surface acted as the solid-friction layer, and acetone loaded in a glass container played the role of contact liquid. The active sensing area of the solid-liquid TENS device was calculated as 1.911 cm² (wire diameter=2 mm, length=3 cm). The container was then placed on a swing oscillator such that the solid triboelectric layer could make periodic contact with the contact liquid to generate triboelectric charges and consequent stable electric output. A bridge rectifier circuit was connected between the solid-liquid TENS and the SR-560 electrometer to regulate the voltage cycles. Then, the electrode covered with the solid triboelectric layer was immersed in and emerged from the contact liquid by performing periodic reciprocating motion at a working frequency of 0.17 Hz according to the method of FIG. 2A to FIG. 2D above, so as to obtain a calibration curve of the output voltage.

The results showed that: grown $TiO_2$ nanosheet arrays exhibited very strong crystallinity and higher phase purity, and strong XRD peaks corresponding to the (011), (123), (220), and (224) lattice planes may be readily attributed to the formation of anatase $TiO_2$. The FESEM image clearly indicated the long-range uniformity of vertically grown $TiO_2$ nanosheets over the Ti surface. The thickness of each $TiO_2$ nanosheet was found to be approximately 2 nm to 5 nm. These nanosheets also exhibited well-resolved lattice fringes with an interplanar spacing of 0.31 nm, corresponding to the (011) lattice plane of anatase $TiO_2$. Moreover, after the reaction with catechin, the $TiO_2$ nanosheet arrays retained their structural integrity.

The results further showed that, with acetone as the contact liquid, the output voltage increased gradually from 0.75 V to 1.2 V with increasing catechin concentration ranging from 1 nM to 10 mM. This enhanced output could be due to that the generated triboelectric output voltage was greatly influenced by the triboelectric charge transfer process, which was proportional to the surface potential difference of the two triboelectric materials.

By employing the equation $\varphi=21.22-(E_{Fermy}-E_{cutoff})$, where $E_{Fermy}$ and $E_{cutoff}$ are the Fermi energy level and the secondary electron cut-off energy level respectively, the work function ($\varphi$) of the $TiO_2$ NS arrays before and after 1 mM catechin modification was evaluated. The work functions for the pristine $TiO_2$ NS arrays and catechin-modified $TiO_2$ NS arrays were calculated as 6.54 eV and 5.52 eV, respectively. The reduction in work function upon catechin functionalization over pristine $TiO_2$ NS surface facilitated enhanced electron transfer by overcoming the surface potential barrier. The obtained results strongly focus on the advantage of chemical modification strategies which may be employed to improve the performance of solid-liquid-based triboelectric nanogenerators as well as exhibits the bright prospects of $TiO_2$ nanosheet array-based TENS as self-biased portable nanosensors for on-field catechin detection to monitor the quality of different health drinks and beverages.

Experimental Example 1-2

<Different Contact Liquid>

Similar to Experimental example 1-1, but this Experimental example 1-2 adopted ethanol and water as the contact liquid to further confirm the sensing performance of the $TiO_2$ nanosheet array-type TENS.

The results showed that: similar to acetone, with ethanol and water as contact liquid, the output voltage was enhanced for both ethanol and water as contact liquid with catechin concentrations ranging from 1 nM to 10 mM. The triboelectric output was enhanced from 0.7 V to 1.1 V and 0.4 V to 0.55 V for ethanol and water as contact liquid, respectively.

Compared to water and ethanol, the voltage response trend of the solid-liquid TENS corresponding to acetone shows better chemically enhanced triboelectric performance. For acetone, the highest voltage enhancement factor (approximately 1.6) is obtained upon modification of the $TiO_2$ surface with 10 mM catechin. The two crucial parameters of TENS of long-range linearity and low limit of detection (LOD) are better satisfied when acetone is used as the contact liquid. The LOD value is quantified as the minimum catechin concentration for which an average detectable enhancement in the electrical signal is obtained by visual estimation from the voltage ratio curve. The voltage ratio curve with acetone demonstrates long-range linearity from 100 nM to 100 μM with an LOD of 30 nM, which is much better than the catechin detection performance shown by solid-solid contact electrification reported previously.

Experimental Example 1-3

<Durability and Stability Testing>

To observe the durability and stability of the solid-liquid TENS, the contact-separation operation was performed for a prolonged time (3 hours).

The results showed that the output voltage cycles were all relatively stable under the contact-separation process carried out for 3 hours. Even after 3 hours of operation, the output voltage cycles hardly exhibited any deviation compared to the initial voltage cycles. Hence, it is conclusively verified that the catechin reaction over $TiO_2$ surface was stable enough and did not undergo any desorption under prolonged time of operation. The obtained results clearly indicate the robustness and mechanical stability of the solid-liquid TENS for practical applications.

Experimental Example 1-4

<Detection of Catechin Concentration of Commercially-Available Green Tea Samples>

The present Experimental example 1-3 is similar to Experimental example 1-1, but a method of standard addition was adopted to detect the unknown catechin concentration in commercially-available green tea specimen. Prior to detection, the green tea samples were diluted in 5 ml of DI water. Then, the diluted samples were spiked with different standard concentrations of catechin (0 μM, 20 μM, 40 μM, 60 μM, and 80 μM) and DI water was added in order to keep the volume constant for each standard added concentration. Later, the catechin standard solutions added with green tea samples were reacted with $TiO_2$ nanosheet arrays for 1 hour to enable the selective binding between Ti and catechol group. Output voltage responses were recorded for the $TiO_2$ nanosheet arrays modified with those catechin-spiked solutions and the corresponding calibration curve was obtained.

The results showed that: the concentration of the diluted samples may be determined from the slope (m) and y-intercept (c) of the calibration curve using the equation: x=|c/m|. Otherwise, it is also allowable to determine the unknown concentration of the diluted samples directly from the absolute value of x-intercept of the calibration curve.

The results of Experimental examples 2-1 to 2-4 showed that: long-term stability and durability of solid-liquid contact electrification with respect to solid-solid contact electrification were ensured. Actually, the lubricating property of liquid allowed the smooth movement of the solid surface in the contact solvent, which in turn boosted the stability of the device. Moreover, studies showed the output voltage of the TENS was not dependent to contact-separation frequency (from 0.17 Hz to 0.5 Hz). Rapid variation in the triboelectric charges at the solid-liquid interface hardly affected the performance of the solid-liquid TENS even at a higher contact frequency as acetone evaporated very quickly from the $TiO_2$ nanosheet arrays. It is also interesting to note that the performance of the solid-liquid TENS remained unaffected by external environmental factors such as humidity. Therefore, the solid-liquid triboelectric system of an embodiment of the invention has good durability and environmental stability.

The following Experimental examples 2-1 to 2-4 may be used to verify that the solid-liquid TENWS sensor of the invention may be used to detect heavy metal ions $Hg^{2+}$.

Experimental Example 2-1

<Preparation of Te Nanowire Array, TeNWs>

Te nanowire arrays (indicated as TeNWs) were grown on an aluminium wire with a diameter of 1 mm following a chemical reduction (also called green chemistry) approach. First, the aluminium wire was cleaned using acetone, isopropyl alcohol, and deionized water (DI water) to get rid of the impurities from the surface of the aluminum wire. Then, the aluminium wire was immersed in a solution containing 0.1 g $TeO_2$ as the precursor and 1 M hydrazine monohydrate ($N_2H_4.H_2O$) as the reducing agent at 60° C. for 10 mins. After the desired reaction time, $TeO_2$ was reduced, and dense arrays of hydrophobic TeNWs were formed on aluminium wire surface. Moreover, for the purpose of examining the effect of surface characteristics of TeNWs on the sensing performance, hydrophilic TeNWs were also grown on the aluminium wire by adjusting the reaction time and temperature. In contrast to its hydrophobic counterpart, the reaction mixture was placed at room temperature for 3 hours for the growth of hydrophilic TeNWs. Finally, the surface of the aluminium wire with as-synthesized TeNWs was rinsed with DI water and dried.

<Reaction with $Hg^{2+}$ and DI Water as Contact Liquid>

Afterwards, the resulting TeNWs were spiked with $Hg^{2+}$ to form $Hg^{2+}$-spiked TeNWs. In the reaction process, aluminum wires with TeNWs were respectively immersed in DI water with different concentrations of $Hg^{2+}$ ions (100 pM, 1 nM, 10 nM, 100 nM, 1 μM, 10 μM, and 100 μM) to react for several minutes to several hours to form $Hg^{2+}$-spiked TeNWs, i.e., HgTeNWs. After the reaction, the samples were dried at ambient temperature. In order to achieve multiple detections simultaneously, polymethyl methacrylate (PMMA) sheet was utilized as the substrate to assemble numerous Al wires together. Then, DI water was used as the contact liquid, and this Experiment 2-1 was performed in a manner similar to Experiment 1-1 to obtain a calibration curve of the output voltage. In addition, TeNWs and HgTeNWs were also analyzed by structure, morphology, and composition characterization techniques.

The experimental results showed that: from the SEM images it is clear that after reaction with 1 μM $Hg^{2+}$, the morphology of TeNWs surface turned rough from smooth. In addition, the contact angle measurement clearly showed that both hydrophobic and hydrophilic TeNWs were transformed into hydrophilic after interacting with $Hg^{2+}$ ions. After reaction with 1 μM $Hg^{2+}$ ions, the average diameter of the hydrophobic and hydrophilic TeNWs increased from 94 to 98 nm and 86 to 90 nm, respectively. The formation of HgTe over the TeNWs surface was further examined in detail using HRTEM analysis. TEM image with EDX line mapping clearly indicated the formation of HgTe layer over the TeNWs surface after the reaction of TeNWs with 1 μM $Hg^{2+}$ ions, signifying the formation of core/shell type Te/HgTe NWs. Moreover, the EDX area mapping revealed the uniform distribution of Te throughout the entire NWs array, whereas strong Hg signal appeared towards the edge of the NWs.

Moreover, the lattice spacings corresponding to the (101) and (102) lattice planes of trigonal Te were 0.32 nm and 0.23 nm, respectively. However, after the reaction of Te with 1 μM $Hg^{2+}$, the lattice spacing of the nanowires changed to 0.37 nm and 0.22 nm indicating the (111) and (220) lattice planes of HgTe nanocrystals. Moreover, formation of good crystalline HgTe over TeNWs was also confirmed from the XRD patterns.

The surface chemical composition TeNWs before and after reaction with 1 μM $Hg^{2+}$ ions was further analyzed by the high resolution XPS. High resolution core level spectra of Te 3d revealed two sharp peaks at 583.7 eV and 573.4 eV binding energy positions corresponding to Te 3d3/2 and Te 3d5/2 spin-orbit split components, respectively. However, upon reaction with $Hg^{2+}$ ions in an aqueous environment, the TeNWs underwent mild surface oxidation which lead to the emergence of two weak peaks at 587.3 eV and 576.5 eV binding energy positions corresponding to $Te^{4+}$ ions. Moreover, successful binding of $Hg^{2+}$ ions on the surface of TeNWs was also reflected from the appearance of sharp Hg 4f peaks at 100.3 eV and 104.3 eV corresponding to Hg 4f7/2 and Hg 4f5/2 spin-orbit split components, respectively.

The results further showed that: when DI water was used as contact liquid, for both types of TeNWs (hydrophobic and hydrophilic), the output voltage decreased after reaction with increasing concentration of $Hg^{2+}$ ions. This may be because the reaction between TeNWs and $Hg^{2+}$ ions reduced the potential difference between TeNWs and the contact liquid, thereby reducing the frictional electrification transfer and the resulting output voltage. Moreover, due to better water repellent property, hydrophobic TeNWs exhibited better separation from DI water after contact and consequently higher output voltage than hydrophilic TeNWs. It is also interesting to note that, with the increase of $Hg^{2+}$ ion concentration, decrease in output voltage for the hydrophilic TeNWs (from 18 mV to 11 mV) was smaller than that of hydrophobic TeNWs (30 mV to 14 mV). Moreover, hydrophobic TeNWs surface turned into hydrophilic gradually as the concentration of the $Hg^{2+}$ ions increased. In contrast, hydrophilic TeNWs retained their initial surface hydrophilicity even after reaction with $Hg^{2+}$.

The change in the surface potential of TeNWs after reaction with $Hg^{2+}$ ions indicated a potential change in the work function of the solid triboelectric layer after reaction with $Hg^{2+}$ ions. The increase in the work functions of the TeNWs surface post reaction with $Hg^{2+}$ ions was probed through UPS measurements. The calculated work functions for hydrophobic and hydrophilic TeNWs were 4.8 eV and 5.3 eV, respectively. However, after reaction with the $Hg^{2+}$ ions, the work function decreased to 4.5 eV and 5.09 eV for hydrophobic and hydrophilic TeNWs, respectively. Theoretical investigations carried out by Density Functional Theory (DFT) calculations also indicated that the work function of HgTe was less than that of pristine Te. Obtained decrease in work function of the TeNWs after reaction with $Hg^{2+}$ ions strongly stipulated that the height of surface potential barrier was reduced as the Te surface started to convert with HgTe after reaction with $Hg^{2+}$ ions.

Experimental Example 2-2

<Acetone as Contact Liquid>

In order to study the effect of different solvent properties on the sensing performance, this Experimental example 2-2 adopted acetone instead of DI water as the contact liquid, and the process conditions were similar to those of Experimental example 2-1.

The use of acetone as contact liquid with regard to DI water generated reverse electric output voltage for both the hydrophobic and hydrophilic TeNWs following an increasing trend with increasing concentration of $Hg^{2+}$. In addition, the output voltage generated using acetone was significantly larger than DI water as the contact liquid. For hydrophobic TeNWs, the output voltage reached up to 63 mV with acetone which was more than 2 times larger than that of DI water (30 mV). Since acetone is a highly volatile solvent it evaporated quickly from solid TeNWs surface irrespective of its hydrophilic or hydrophobic nature and ensured better separation from the contact liquid which in turn increased the output voltage.

The experimental results also showed that the difference in output voltage generated between the hydrophobic TeNWs and the hydrophilic TeNWs was negligible. The increasing trend of output voltage with increasing concentration of $Hg^{2+}$ may be explained in terms of change in work function probed through UPS. Electrons may easily come out from the surface by overcoming the surface potential barrier which further facilitated higher triboelectric charge transfer into acetone and subsequent gradual increase in the output voltage. Hence, it was verified that when acetone was used as contact solvent, the work function of Te/HgTeNWs surface played the dominant role in controlling the contact electrification.

However, it is to be noted that in the case of DI water as contact solvent, surface hydrophobicity acted as the most crucial parameter to control the triboelectric charge transfer processes. When DI water was used as the contact liquid, sensitivity of hydrophobic TeNWs was better than that of the hydrophilic one. In contrast, the sensitivity of both hydrophobic and hydrophilic TeNWs was almost same in the case of acetone as the contact liquid. In other words, HgTe/TeNWs was used as the sensing layer. When DI water was used as the contact liquid, the hydrophobicity of TeNWs played a key role in controlling the triboelectric charge transfer; and when a volatile solvent, such as acetone, was used as the contact liquid, the work function played a leading role.

Experimental Example 2-3

<Evaluation of Selectivity>

Experimental example 2-3 was carried out in a similar manner to Experimental example 2-1, and the difference is that the selectivity of the nanosensors of the embodiments of the invention towards $Hg^{2+}$ ions was further estimated by immersing TeNWs in a deionized water solution containing other interfering metal ions ($Na^+$, $K+$, $Cu^{2+}$, $Pb^{2+}$, $Mg^{2+}$, $Ca^{2+}$, $Ba2^+$, $Cd^{2+}$, and $Zn^{2+}$) commonly present in the natural environment and $Hg^{2+}$ ions.

The results showed that: the triboelectric response voltage ($\Delta V=|V_{control}-V_{metal\ ion}|$) of TeNWs in the presence of different metal ions showed that the response voltage of the nanosensors for $Hg^{2+}$ was 4.4 and 5.8 times higher than that of other metal ions when DI water and acetone were used as the contact solvent, respectively. Among the other metal ions only $Hg^{2+}$ had stronger binding affinity with Te, leading to the formation of HgTe, which made the TeNWs highly selective towards $Hg^{2+}$. The highly selective nature of the solid-liquid triboelectric nanosensors of the embodiments of the invention highlights its great potential towards in-field sensing.

Experimental Example 2-4

<Real Water Sample>

Real-time sensing performance of the nanosensors was respectively checked by detecting $Hg^{2+}$ ions in real water samples collected from tap water, lake water, and sea water.

The results showed that, for real water samples, the overall output voltage exhibited by the nanosensors of the embodiments of the invention was smaller than that of DI water samples containing $Hg^{2+}$ ions. This may be attributed to the fact that real water samples are comprised of numerous ions which possessed a high probability of getting absorbed onto the triboelectric surface during the contact-electrification process, causing an incomplete screening of triboelectric charges on TeNWs surface, and thereby resulting in reduced output voltage. Despite this factor, the obtained results strongly suggested that the designed triboelectric nanosensors may always successfully detect $Hg^{2+}$ ions in real environmental samples in a relatively wide linear range (10 nM to 10 µM) with a detection limit of 5 nM. Moreover, the sensors of the embodiments of the invention may monitor $Hg^{2+}$ ions in real samples in real time without requiring any sophisticated supporting equipment (such as an electrometer).

The results of Experimental examples 2-1 to 2-4 showed that: the high binding affinity of $Hg^{2+}$ ions with Te played the crucial role in converting the surface of TeNWs into Te/HgTe core-shell nanowires upon reaction with $Hg^{2+}$ ions and was identified as the principal phenomenon responsible for the contact electrification-based sensing mechanism. When DI water was used as the contact solvent, surface hydrophobicity of the nanowires played the dominant role in changing the triboelectric output voltage. However, after reaction with $Hg^{2+}$ ions, TeNWs exhibited a significant reduction in work function which came out to be most effective in controlling the triboelectric output when acetone was used as contact liquid. Moreover, the surface potential of TeNWs became more positive upon reaction with $Hg^{2+}$ ions which in turn weakened the potential difference with DI water and the output reduced gradually in the case of DI water as contact liquid. In addition, as a low boiling point solvent acetone readily discarded any possibility of electrode wetting problem, it ensured higher triboelectric output as compared to DI water. TeNWs may sense $Hg^{2+}$ ions even in real samples in a wide linear range (10 nM to 10 µM) with a LOD of 5 nM. Obtained results clearly validated the role of different physical parameters in triboelectric contact electrification and at the same time highlighted the bright prospect of TeNWs-based TENS for applying in real-time environmental monitoring applications.

The following Experimental examples 3-1 to 3-7 may be used to verify that the solid-liquid TENWS sensor of the invention may be used to detect bacteria and may be reused.

Bacteria are microorganisms found everywhere in our daily lives. Some bacterial strains are known to cause serious infections in humans. *Escherichia coli* is widely associated with life-threatening bacterial infections. Usually, *E. coli* is mainly present in the intestines and guts of human and other animals. However, under certain conditions, *E. coli* may also be harmful to the human body, i.e., urinary tract infections (UTI), diarrhea, peritonitis, etc. Moreover, *E.* coli is also commonly used as an indicator of sewage detection. In fact, it is reported that *E. coli* is responsible for 75% to 95% of the UTIs in females. UTI is one of the most common bacterial infections occurring in communities and hospitals. The infection route is based on the migration of the *E. coli* from the gastrointestinal tract to the area around the urethra and eventually entering the bladder from the urethra upward. Following this, as part of the pathogenic mechanism established during the acute phase of infection, an intracellular bacterial community is formed in the urothelium of the bladder.

Out of all strains, Uropathogenic *Escherichia coli* (UPEC) is the most common causative agent for UTI. The vast majority of UTI *E. coli* isolates is composed of 1 μm to 2 μm long filamentous surface adherent organelles (called type I pili), which are the major factors for the bacterial infections. Until now, there have been many studies focusing on the composition of type I pili in order to understand the mechanism of infection caused by *E. coli*. It has been reported that type I pili are composed of protein, and their tips contain adhesin FimH. The interaction between receptors expressed on the surface of the bladder epithelial cavity seems to be critical to the ability of many UPECs to colonize the bladder and cause UTIs. Adhesin FimH binds to D-mannose-containing glycoprotein receptors and may mediate bacterial attachment to many different host cell types. Type I fimbriae-driven binding may lead to invasion of mouse and human bladder epithelial cells such as uroplakin receptors in the uroepithelium, which are present in the differentiated cells of the urothelial cells.

The traditional bacterial detection methods include utilization of various sophisticated instruments and bio/chemical assays for direct and indirect determination of bacteria, usually including morphological assessment of microorganisms and testing the ability of organisms to grow in various culture media under various conditions. Examples include polymerase chain reaction (PCR), fluorescence detection, flow cytometry, electrochemical probes, etc. Although these techniques display successful detection, their utilization is limited by certain challenges. For instance, the PCR method is very sensitive, however, it requires complex sample preparation steps, long-term sample processing, and molecular biology expertise to perform the assay. In addition, fluorescence detection also limits the need for expensive equipment and complex procedures. Moreover, flow cytometry analysis involves high investment costs and requires instruments with high sensitivity and complexity.

Experimental Example 3-1

<Preparation of Gold Nanoparticle AuNPs>

For the preparation of solid-liquid TENS for *E. coli* detection, highly pure copper wires of 1 mm diameter were used as the solid substrate for nanomaterial growth and also as the electrode. All of the copper wires were cut to 3 cm and were cleaned with acetone, isopropanol, and deionized water (DI water) in order to remove the impurities on the surface. Out of the total length, 1 cm of the area was chosen as the sensing zone which was immersed in a 1 mM $HAuCL_4$ solution at 37 degrees Celsius for 30 minutes. After the reaction time, the color of the copper wire changed to black indicating the successful synthesis of gold nanoparticles (AuNPs) on the copper surface. It should be noted that the size and shape of AuNPs may be adjusted by controlling reaction time and reaction temperature. In order to remove the excess $HAuCL_4$ solution and non-specific bound gold nanoparticles, the samples were rinsed in DI water three times to obtain a clean reaction surface for further surface modification for the sensing experiments.

<Surface Reaction of AuNPs with D-Mannose Layer and Reaction with Concanavalin a (ConA)>

The D-mannose was modified with a thiol group to form 6-mercaptohexyl D-mannopyranoside in order to bind strongly to AuNPs. For simplicity, 6-mercaptohexyl D-mannopyranoside is referred to as D-mannose solution in the following. Here, $10^{-3}$ M D-mannose solution was allowed to react with AuNPs for 3 hours at 37 degrees Celsius. After the reaction, a thin layer of D-mannose was modified on the surface of AuNPs due to the strong ionic bonds formed between AuNPs and the thiol group of D-mannose. Subsequently, DI water was used to wash off excess D-mannose solution and remove the unbound D-mannose from the sensing surface.

To verify the functionalization by the D-mannose on the Au nanoparticles, FTIR was utilized to analyze the samples. Literature survey revealed that FTIR spectra of D-mannose exhibited some characteristic peaks corresponding to particular bond stretching vibration. Corresponding to its chemical structure, the identified functional groups in D-mannose included the alcoholic hydroxyl and carboxyl groups, characterized by the strong vibration bands of O—H at 3600 to 3200 $cm^{-1}$ and C—O at 1320 to 1210 $cm^{-1}$. After adjusting different reaction times for D-mannose and gold, some obvious differences were clearly visible in the FTIR spectra of the samples with reaction time of 0, 1, 3 hrs respectively. The two strong vibration bands appeared (at 3600 to 3200 $cm^{-1}$ and 1320 to 1210 $cm^{-1}$) after three hours of reaction with D-mannose. Those vibration bands may be readily matched with the characteristics FTIR spectra of D-mannose. Therefore, the 3-hour D-mannose reacted samples were used for further investigations in this study.

High resolution Au 4f core level spectra of both gold nanoparticles and D-mannose-modified gold nanoparticles contain two peaks corresponding to 4f5/2 and 4f7/2 spin-orbit split components of Au. The peaks located at 84.2 eV and 87.8 eV binding energy positions may be attributed to metallic gold (Au (0)) whereas the peaks appearing at 85.2 eV and 88.9 eV may be indexed as the $Au^{3+}$ exhibiting the occurrence of mild surface oxidation. Au 4f core level spectra also revealed that most of the Au nanoparticles before and after D-mannose functionalization were in a metallic state that further reflected the purity of the synthesized Au nanoparticles. Cu 2p high resolution XPS also indicated the presence of two spin-orbit split components at 932.3 eV and 952.2 eV corresponding to Cu 2p3/2 and Cu 2p1/2, respectively. Absence of any shake-up satellite peak strongly indicated that Cu wires retained their initial metallic nature even after chemical modification with D-mannose which indeed was very important in order to use the samples for the electrode in triboelectric sensors.

In order to analyze the binding between the AuNPs and D-mannose, high-resolution core-level spectra of C 1s, O 1s, and S 2p were recorded. The thiol groups of D-mannose had very strong binding affinity with Au which was further reflected from the XPS analysis.

Surface modification with D-mannose revealed the significant contribution from C—C/C═C bonds (284.6 eV), C—S bonds (286.4 eV), C—O bonds (287.9 eV), and C═O bonds (289 eV), proving the binding between AuNPs and D-mannose. O is core level spectra of modified AuNPs confirmed the C—OH bond formation due to the D-mannose binding. In addition to C—OH bond, peaks signifying surface hydroxyl groups and chemically adsorbed oxygen groups were also clearly visible from the O 1s core level spectra. The presence of C—S bonds was also observed from the S 2p core level spectra assigned to 2p1/2 and 2p3/2 spin-orbit split components of sulfur. The aforementioned results clearly confirmed the successful modification of D-mannose to Au nanoparticles surface.

To establish a label-free sensor system, first we verified the mechanism used Concanavalin A (ConA) which is a common lectin originally extracted from the *Canavalia ensiformis*. It specifically binds with certain structures found in various sugars, glycoproteins, and glycolipids, mainly internal and non-reducing terminal α-D-mannosyl and α-D-glucosyl groups. After modifying the gold nanoparticles with a thin layer of D-mannose, the nanosensors were put into as-prepared ConA solution at 37° C. for two hours. The different concentrations of ConA solutions were diluted by PBS buffer 1× with $CaCl_2$). The surface potential of the sample surface was measured using the Kelvin Probe Force Microscopy (KPFM) in order to understand the charge transfer phenomenon.

The results showed that: the KPFM image of the modified AuNPs showed that as the ConA concentration increased, the surface potential increased. The surface potentials of gold nanoparticles reacted with different concentrations of ConA ($10^{-8}$M, $10^{-7}$ M, $10^{-6}$ M, $10^{-5}$M, $10^{-4}$ M, respectively) were 230 mV, 270 mV, 300 mV, 340 mV, 380 mV, respectively. The surface of the AuNPs became positive, therefore increasing the difference of potential between the contact liquid and electrode.

Experimental Example 3-2

<Reaction with *E. coli*>

Experimental example 3-2 is similar to Experimental example 3-1, but ConA was replaced by an *E. coli* solution. The as-formed D-mannose layer was employed as the recognition element for selective binding of the type I pilus on *E. coli*. Owing to this principle, the as-synthesized D-mannose-modified AuNPs surface was reacted with different concentrations of *E. coli* solution ($2\times10^3$ to $2\times10^8$ colony-forming units/ml) prepared in PBS buffer for evaluating the sensing performance. Since the bacterial liquid may settle over time, the reaction was kept at 37° C. for 1 hour with stirring.

*E. coli* cells were grown following the standard procedure in the Lysogeny broth (LB) medium. For the storage of the *E. coli* cells, an inoculating loop was used to scrape off the bacterial colonies on the agar plate which was then mixed with 250 μL of glycerol and 750 μL of LB medium. These bacterial samples were loaded into the cell freezing container, and then refrigerated at −80 degrees Celsius to avoid the bacteria from losing its morphology during the rapid freezing process. For agar plate preparation, 10 g LB broth and 7.5 g LB were added to the 500 mL deionized water in a serum bottle. The serum bottle was sterilized in the autoclave (EZ-SS50E/72E) for 30 minutes. Following this, 15 mL LB broth-agar was poured in each plastic petri plate until it turned to solid state which were then stored at −4 degrees Celsius.

For preparation of the bacterial culture, the previously frozen *E. coli* colonies were coated on the agar plate by the streak-plating method, followed by their incubation at 37 degrees Celsius for 18 hours. After 18 hours, the first-generation of *E. coli* cells were obtained. Then, a colony of the first-generation *E. coli* cells was diluted into 3 mL LB and incubated in a similar way to get the second-generation *E. coli*. In this study, broth was used as the dilution solution and the blank solution, and bacterial generations between 3 and 5 having the best activity were used for the sensing study. The bacterial colonies were quantified in terms of the optical density (OD value) measured using the Nanodrop through the calibration line established.

D-mannose-modified AuNPs surface was used as the solid triboelectric layer and the PBS buffer was used as the contact solvent for detecting different concentrations of *E. coli*. The solid and the liquid layer were subjected to periodic contact-separation cycles with the help of a vertical dip coating system in order to generate the triboelectric effect. The sensing performance was measured in terms of the output voltage change obtained with the as-developed nanosensors, operating in the single-electrode configuration. The obtained output voltages due to the triboelectric phenomenon were measured using a low-noise preamplifier (Stanford Research System Model SR560) and LabVIEW software controller. The rectified output signals were procured by using a bridge rectifier between TENS and SR-560 electrometer.

The results according to the KPFM image showed that: at the place where *E. coli* was attached, the local brightness at those points was higher than the nearby surroundings indicating an increase in surface potential. The Gaussian distribution profiles of *E. coli*-reacted and D-mannose-modified AuNPs indicated that the surface potential was around 286 mV.

The above results showed that: increase in surface potential after the reaction with *E. coli* or ConA may be further analyzed by the shift of valence band maximum (VBM) obtained from high resolution XPS valence band spectra (VBS). The valence band maximum value of the as-prepared D-mannose-modified AuNPs sample was around 0.44 eV. After the reaction with *E. coli* or ConA solution, there was a slight shift in the value to 0.41 eV and 0.38 eV, respectively. The obtained shift clearly indicated that VBM position shifted upward and approached towards the Fermi level as the samples were functionalized by *E. coli* or ConA. Hence, the distance between vacuum level and VBM reduced gradually. Hence, electrons may easily come out to the surface and the surface potential increased consequently. This result indirectly proved that the work function of these sample surfaces decreased with the functionalization of both *E. coli* and ConA.

The increase in the surface potential after binding of ConA/*E. coli* signified a decrease in the work function which was further measured using the Ultraviolet Photoelectron Spectroscopy (UPS). The work function of D-mannose-modified AuNPs and after *E. coli* or ConA functionalization was calculated by employing the equation from secondary electron cut-off energy and Fermi level $$\Phi = 21.22 - (E_{Fermi} - E_{Cut\text{-}Off}).$$

Specifically, hv=21.22 eV is the energy of He—I line that was used to conduct the UPS analysis. The calculated work functions for D-mannose-modified AuNPs and after the functionalization with *E. coli* and ConA were 6.72 eV, 5.52 eV, and 5.32 eV, respectively. The result is strong evidence that after the functionalization with *E. coli* and ConA, the value of work function was reduced gradually. According to the measurement results, a substance with a smaller work function indicated a relatively easy charge transfer. Therefore, it is expected that after a higher concentration of *E. coli* or ConA is reacted, a larger electrical output is generated during the contact separation process with the liquid.

Experimental Example 3-3

<Reaction with ConA>

This experimental example is similar to Experimental example 3-2, but the D-mannose-modified AuNPs surface was continuously reacted with different concentrations of ConA 0 M, $10^{-9}$ M, $10^{-8}$ M, $10^{-7}$ M, $10^{-6}$ M, $10^{-5}$ M, and $10^{-4}$ M at 37 degrees Celsius for two hours. Moreover, in the experiment setup, a glass container with contact liquid was fixed on a dip coater (DX-5A), which may move vertically to provide periodic contact-separation movements. The immersion and withdraw rate was set to 400 mm/m, and the coating time was 1 sec. The PBS buffer was chosen as the contact solution based on its similarity to physiological environments for real-time detection. The output signals were measured through a rectifier circuit by connecting a bridge rectifier in between the TENS and SR-560 electrometer. The static charges on the surface were generated by the process of contact electrification followed by driving of the electrons in an external circuit due to the potential difference generated by an applied mechanical force.

The results showed that: with the increase in ConA concentration (from 0 M, $10^{-9}$ M, $10^{-8}$M, $10^{-7}$ M, $10^{-6}$ M, $10^{-5}$ M, to $10^{-4}$ M), the triboelectric output was increased gradually (from 37.5 mV, 38 mV, 38 mV, 41 mV, 43.5 mV, 45 mV, to 47 mV). A total shift of 10 mV was observed with the variation in the concentrations of ConA.

The reason for the increased output may be corroborated from the idea that the charge transfer process during the sensing of the ConA was predominant by the work function change. The work function of the solid surface decreased which allowed for high number of electrons to be transferred by overcoming the potential barrier, hence resulting in enhanced triboelectric output after ConA functionalization. From the results, it may be clearly seen that the linear range of the designed sensor for ConA detection was between $10^{-8}$ and $10^{-6}$ M, and the limit of detection was about $2\times10^{-9}$ M. The results showed a positive correlation, and the label-free system of the invention was successfully used to demonstrate the ability to detect biomolecules.

Experiment 3-4

<Detection of E. coli ORN 178 Bacteria>

The evidence of selectivity between the FimH protein and mannose groups from the previous results opened the possibility of using the as-designed TENS for real-time detection of *E. coli* ORN178 bacteria. Since *E. coli* ORN178 possesses the FimH group and selectively binds to the D-mannose moieties, it was employed as the target analyte. Prior to the detection, different concentrations of *E. coli* ORN178 solutions were prepared by diluting them in the PBS buffer. It is noteworthy that the *E. coli* solutions were stirred during the reaction in order to avoid the formation of any precipitate. The *E. coli* ORN178 functionalized surface was also subjected to contact-separation cycle with the PBS buffer via an external force. The sensing performance of the *E. coli*-modified TENS was also investigated.

The results showed that: with the increase in the *E. coli* concentrations, the triboelectric voltage output also increased. The *E. coli* concentrations were 0, $2\times10^3$, $2\times10^4$, $2\times10^5$, $2\times10^6$, $2\times10^7$, and $2\times10^8$ CFU/ml, and the corresponding voltage outputs were 37 mV, 37.5 mV, 38.5 mV, 40 mV, 42 mV, 44 mV, and 45 mV, respectively. The increased output voltage may also be related to the decreased work function-governed enhanced charge transfer. The linear range of the designed sensor for *E. coli* detection was between $2\times10^4$ to $2\times10^7$ CFU/ml, and the limit of detection was $4\times10^3$ CFU/ml. This result showed that TENS had good sensitivity for sensing different concentrations of *E. coli* bacteria.

Experiment 3-5

<Concentration of E. coli and Surface Morphology of Solid Triboelectric Layer>

In order to further confirm the successful attachment of the bacteria to the solid triboelectric layer corroborating to the enhanced output, SEM characterization was done to observe the surface morphology of the *E. coli* functionalized solid triboelectric layer. The concentrations used here were $2\times10^5$ and $2\times10^7$ CFU/ml to represent relatively low and high concentrations of *E. coli*. Before the dehydration and bacterial fixation procedures of *E. coli* functionalized TENS, DI water was used to wash away the salt crystals that may form on the surface after reacting with PBS buffer diluted *E. coli* solution.

The results of the experiment showed that: it may be seen from the SEM image that when the bacterial concentration was different, the density of bacterial distribution on the surface of TENS was also very different.

Experiment 3-6

<Selectivity>

After determining the sensitivity of the label-free *E. coli*-based TENS system, the selectivity of the sensor was tested in the presence of other bacteria (such as *E. coli* ORN208 and *S. aureus* XEN30) which lacked the type I pili. For the sensitivity test, *E. coli* ORN208 and *S. aureus* XEN30 were grown in LB broth and Tryptone Soy Broth (TSB) respectively. During the experiments, all reaction parameters were consistent.

The experimental results showed that: for the experimental groups *E. coli* ORN208 and *S. aureus* XEN30, the output change was almost equal to the control group which had no bacteria in the solution, demonstrating the high selectivity of the as-developed sensor. Since the two bacterial strains *E. coli* ORN208 and *S. aureus* XEN30 lacked type I pili, they did not bind to the D-mannose, therefore resulting negligible change in the output voltage.

Compared to the control group, the selective one, the output performance was increased when the concentration of *E. coli* ORN178 was higher. From the results, it may be seen that after *E. coli* ORN178 functionalization, the output voltage was enhanced by almost 10 mV whereas for the non-selective strains, the change was almost equal to 0 mV after functionalization and with the increase in the bacterial concentrations.

Experiment 3-7

<Reusability>

The reusability test of the sensing surface was carried out by using a simple detachment method. After performing a detection assay for the target, the solid triboelectric layer was reacted with high concentration of D-mannose (100 mM). The high concentration of D-mannose was used in order to destroy the specific binding between the target and D-mannose.

After the designed TENS was reacted with a high concentration of D-mannose solution, the attached ConA target tended to bind to a higher concentration D-mannose, thus removing the surface target.

For the reusability test, ConA was chosen as the target for binding to the D-mannose surface. After the $10^{-6}$ M ConA solution was reacted with TENS in the same way (cycle 1), TENS was used in a high concentration D-mannose solution at room temperature for 30 minutes. Next, the reduced TENS was reacted with ConA solution again (cycle 2), and then these steps were repeated to get the cycle 3 TENS. Between each step, KPFM was used to analyze the surface potential. The voltage output during each cycle was also measured.

The results showed that: after the reactions of cycle 1, cycle 2, and cycle 3, the surface potentials were 300 mV, 310 mV, and 305 mV respectively. The surface potential after reaction with high concentration D-mannose solution decreased back to the TENS surface potential before the reaction with ConA.

It may be known from the stable voltage output that after the first cycle, the TENS voltage output after the reaction with the ConA solution was 44 mV. After reduction with high concentration of D-mannose solution to cut off the surface target, the output dropped to 37 mV. When the second cycle finished, the output performance of TENS increased to 45 mV. After reacting with the high-concentration D-mannose solution again, the electrical output dropped back to about 37.5 mV. Reacting with ConA solution again, the voltage performance rose again to 44.5 mV as expected. This positive result directly verified the reusability of TENS.

The results of Experimental examples 3-1 to 3-7 showed that: the specific binding between D-mannose and type I pili is the key parameter that governs the main designing principle of the label-free E. coli detection system. The sensors of the embodiments of the invention possess certain advantages such as low-cost, simple to use, reusable, highly sensitive, and selective. Compared to traditional detection methods, the TENS of the embodiments of the invention neither require complex sample preparation nor rely on sophisticated expertise with professional technicians. Moreover, the TENS of the embodiments of the invention are capable of detecting pathogens within a few hours whereas traditional detection methods take around one week to collect results. The designed TENS for E. coli detection may work in a broad linear range between $2 \times 10^4$ to $2 \times 10^7$ CFU/ml with a limit of detection of $4 \times 10^3$ CFU/ml. Obtained results strongly highlight the great potential of triboelectric nanosensors for detecting toxic pathogens and further indicate their applicability in detecting other biomolecules (such as proteins or DNA).

There are several differences between the invention and previous sensing strategies. First of all, fluorescence spectroscopy and most of the electrochemical sensors are label-based detection systems, but the chemical sensors of the embodiments of the invention are label free which requires simple assessment technique for chemical sensing applications by reducing the liabilities created by the use of labels. Moreover, the chemical sensors of the embodiments of the invention simplify the time and effort required for assay development, and at the same time remove the experimental artefacts of quenching, shelf life, and background fluorescence.

Secondly, chromatography and electrophoresis-based chemical sensors require bulky systems, longer response time, and well-trained system operators for high-precision chemical sensing. Moreover, although colorimetric sensing assay is portable in comparison with the chromatographic and electrophoretic approach, reproducibility of printing and imaging with scanning methods make the system more complex. In contrast, the chemical sensors of the embodiments of the invention are portable and compatible with in-field real-time chemical sensing, which does not require any well-trained operator.

Thirdly, most of the previously mentioned sensing methodologies require additional circuitry for biasing purpose. As an example, for potentiometric electrochemical systems, a constant potential is applied between working and reference electrodes. The change of this potential is the measure of the concentration of target analytes trapped by the working electrode. Therefore, to facilitate successful detection of the analytes, a biasing circuit connected with a battery is essential for this kind of sensing strategy. On the other hand, the triboelectric-based chemical sensors of the embodiments of the invention are self-biased which do not need any battery or external energy conversion circuitry for sensing.

What is claimed is:

1. A solid-liquid contact electrification-based self-driving chemical sensor, comprising:
    a container;
    a contact liquid placed in the container;
    a single electrode actively or passively moved into the container to be immersed in or emerged from the contact liquid;
    a solid triboelectric layer surrounding and covering a surface of the single electrode, wherein the solid triboelectric layer comprises a reacted sensing layer, and the reacted sensing layer is formed by reacting a sensing layer with a target analyte;
    a rectifier and a load, connected to the single electrode; and
    a displacement device connected to the single electrode or the container to perform a periodic reciprocating motion, so that the solid triboelectric layer is in contact with and separated from the contact liquid, thereby generating a surface charge transfer to generate an electrical output signal.

2. The solid-liquid contact electrification-based self-driving chemical sensor of claim 1, wherein the sensing layer comprises a microstructure or a nanostructure.

3. The solid-liquid contact electrification-based self-driving chemical sensor of claim 1, wherein the sensing layer comprises an unreacted material or a reacted material.

4. The solid-liquid contact electrification-based self-driving chemical sensor of claim 3, wherein the unreacted material comprises a metal oxide, a metal, a semiconductor, and the reacted material comprises a reacted metal oxide, a reacted metal, a reacted semiconductor, or a combination thereof.

5. The solid-liquid contact electrification-based self-driving chemical sensor of claim 3, wherein the unreacted material comprises a titanium oxide nanosheet array or a Te nanowire array, and the reacted material comprises a gold nanoparticle array reacted with a sulfhydryl group of D-mannose.

6. The solid-liquid contact electrification-based self-driving chemical sensor of claim 1, wherein the contact liquid comprises water, a buffer solution, or an organic solvent.

7. The solid-liquid contact electrification-based self-driving chemical sensor of claim 1, wherein the single electrode is in a shape of a column, a sheet, a strip, a rod, a wire, or a combination thereof, and the sensing layer covers the surface of the single electrode.

8. The solid-liquid contact electrification-based self-driving chemical sensor of claim 1, further comprising a capacitor connected in parallel between the rectifier and the load.

9. The solid-liquid contact electrification-based self-driving chemical sensor of claim 8, further comprising a resistor connected in parallel between the capacitor and the load.

10. The solid-liquid contact electrification-based self-driving chemical sensor of claim 1, wherein the displacement device is connected to the single electrode to move the single electrode so that the solid triboelectric layer is immersed in or emerged from the contact liquid.

11. The solid-liquid contact electrification-based self-driving chemical sensor of claim 1, wherein the displacement device is connected to the container to move the container so that the contact liquid is in contact with and separated from the solid triboelectric layer.

12. A solid-liquid contact electrification-based self-driving chemical sensor, comprising:
a container;
a contact liquid placed in the container;
a single electrode actively or passively moved into the container to be immersed in or emerged from the contact liquid;
a solid triboelectric layer surrounding and covering a surface of the single electrode, wherein the solid triboelectric layer comprises a reacted sensing layer, wherein the reacted sensing layer is formed by reacting a sensing layer with a target analyte, and a work function or a hydrophilicity/hydrophobicity of the sensing layer is altered from a work function or a hydrophilicity/hydrophobicity of the reacted sensing layer;
a rectifier and a load, connected to the single electrode; and
a displacement device connected to the single electrode or the container to perform a periodic reciprocating motion, so that the solid triboelectric layer is in contact with and separated from the contact liquid, thereby generating a surface charge transfer to generate an electrical output signal.

13. The solid-liquid contact electrification-based self-driving chemical sensor of claim 12, wherein the work function of the reacted sensing layer is lower than or higher than the work function of the sensing layer.

14. The solid-liquid contact electrification-based self-driving chemical sensor of claim 12, wherein the sensing layer is hydrophilic, and the reacted sensing layer is hydrophobic.

15. The solid-liquid contact electrification-based self-driving chemical sensor of claim 12, wherein the sensing layer is hydrophobic, and the reacted sensing layer is hydrophilic.

16. A sensing method of a solid-liquid contact electrification-based self-driving chemical sensor, comprising:
providing a single electrode, wherein a surface of the single electrode is covered by a solid triboelectric layer; and
performing a periodic reciprocating movement of contact and separation on the solid triboelectric layer and a contact liquid, thereby generating a surface charge transfer to generate an electrical output signal, wherein the solid triboelectric layer comprises a reacted sensing layer, wherein the reacted sensing layer is formed by reacting a sensing layer with a target analyte, and a work function or a hydrophilicity/hydrophobicity of the sensing layer is altered from a work function or a hydrophilicity/hydrophobicity of the reacted sensing layer.

17. The method of claim 16, wherein the work function of the reacted sensing layer is lower than or higher than the work function of the sensing layer.

18. The method of claim 16, wherein the sensing layer is hydrophilic, and the reacted sensing layer is hydrophobic.

19. The method of claim 16, wherein the reacted sensing layer is hydrophobic, and the reacted sensing layer is hydrophilic.

20. A method of manufacturing a solid-liquid contact electrification-based self-driving chemical sensor, comprising:
providing a single electrode;
forming a sensing layer to cover a surface of the single electrode;
reacting the sensing layer with a target analyte to form a reacted sensing layer, wherein the sensing layer and the reacted sensing layer form a solid triboelectric layer;
connecting the single electrode to the rectifier; and
connecting the single electrode or a container to a displacement device to perform a periodic reciprocating motion, so that the solid triboelectric layer is in contact with and separated from a contact liquid, thereby generating a surface charge transfer to generate an electrical output signal.

21. The method of claim 20, wherein a method of forming the solid triboelectric layer comprises:
forming a plurality of microstructures or nanostructures on the surface of the single electrode as the sensing layer;
reacting the plurality of microstructures or nanostructures with the target analyte to form the reacted sensing layer, wherein a work function or a hydrophilicity/hydrophobicity of the reacted sensing layer is altered from a work function or a hydrophilicity/hydrophobicity of the sensing layer.

22. The method of claim 21, wherein the microstructures or nanostructures comprise a titanium oxide nanosheet array or a Te nanowire array.

23. The method of claim 20, wherein a method of forming the solid triboelectric layer comprises:
forming a plurality of microstructures or nanostructures on the surface of the single electrode;
reacting the microstructures or nanostructures to the target analyte to form the sensing layer; and
reacting the sensing layer with the target analyte to form the reacted sensing layer.

24. The method of claim 23, wherein the microstructures or nanostructures comprise a gold nanoparticle array, and the sensing layer comprises a gold nanoparticle array reacted with a sulfhydryl group of D-mannose.

* * * * *